US008650114B2

(12) United States Patent
Pappas et al.

(10) Patent No.: US 8,650,114 B2
(45) Date of Patent: *Feb. 11, 2014

(54) METHOD AND SYSTEM FOR RESERVING FUTURE PURCHASES OF GOODS OR SERVICES

(71) Applicant: Smart Options, LLC, Chicago, IL (US)

(72) Inventors: Christian S. Pappas, Chicago, IL (US); Charles P. Brown, Chicago, IL (US)

(73) Assignee: Smart Options, LLC, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/662,815

(22) Filed: Oct. 29, 2012

(65) Prior Publication Data

US 2013/0096965 A1   Apr. 18, 2013

Related U.S. Application Data

(63) Continuation-in-part of application No. 13/190,892, filed on Jul. 26, 2011, now Pat. No. 8,301,550, which is a continuation-in-part of application No. 12/005,149, filed on Dec. 21, 2007, now Pat. No. 7,996,292, which is a continuation-in-part of application No. 09/566,671, filed on May 8, 2000, now Pat. No. 7,313,539.

(51) Int. Cl.
*G06Q 40/00* (2012.01)
(52) U.S. Cl.
USPC .............................................. 705/37; 705/35
(58) Field of Classification Search
USPC ...................................................... 705/37, 35
See application file for complete search history.

(56) References Cited

U.S. PATENT DOCUMENTS

| 4,823,265 | A | 4/1989 | Nelson |
| 4,903,201 | A | 2/1990 | Wagner |
| 5,237,499 | A | 8/1993 | Garback |
| 5,297,031 | A | 3/1994 | Gutterman |
| 5,590,197 | A | 12/1996 | Chen et al. |

(Continued)

FOREIGN PATENT DOCUMENTS

WO   WO9926173   5/1999

OTHER PUBLICATIONS

Business Wire; "(TVLY) Priceline.com, Travelocity.com Marketing Alliance Launches"; Monday, Apr. 10, 2000, Document Type: Newswire.*

(Continued)

*Primary Examiner* — Edward Chang
(74) *Attorney, Agent, or Firm* — Lesavich High-Tech Law Group, P.C.; Stephen Lesavich

(57) ABSTRACT

A method and system for reserving future purchases of airline services using electronic options. The electronic options are used to reserve plural different types of airline services including selection of: a desired seat row location, a desired seat location in a desired row location, a plural adjacent seats in a desired row, a plural adjacent seats in a plural desired rows, a desired location in an overhead bin to store carry-on luggage, a priority boarding sequence, a priority exiting sequence, priority pre-flight baggage handling, priority post-flight baggage handling, cancellation and change privileges for a purchased airline ticket, a priority list position in a stand-by list and/or a priority list position for an automatic upgrade to a first class seat, business class seat or other non-economy seat and/or other airline services.

20 Claims, 17 Drawing Sheets

(56) References Cited

U.S. PATENT DOCUMENTS

| | | |
|---|---|---|
| 5,671,363 A | 9/1997 | Cristofich |
| 5,732,398 A * | 3/1998 | Tagawa ............... 705/5 |
| 5,732,400 A | 3/1998 | Mandler et al. |
| 5,778,357 A | 7/1998 | Kolton et al. |
| 5,794,207 A | 8/1998 | Walker |
| 5,797,127 A * | 8/1998 | Walker et al. ............ 705/5 |
| 5,855,007 A | 12/1998 | Jovicic |
| 5,884,277 A | 3/1999 | Khosla |
| 5,884,286 A | 3/1999 | Daughtery, III |
| 5,897,620 A | 4/1999 | Walker |
| 5,905,246 A | 5/1999 | Fajkowski |
| 5,948,040 A | 9/1999 | DeLorme |
| 5,991,744 A | 11/1999 | DiCresce |
| 6,012,045 A | 1/2000 | Barzilai |
| 6,016,483 A | 1/2000 | Rickard |
| 6,024,641 A | 2/2000 | Sarno |
| 6,035,289 A | 3/2000 | Chou |
| 6,041,308 A | 3/2000 | Walker |
| 6,049,778 A | 4/2000 | Walker |
| 6,049,783 A | 4/2000 | Segal |
| 6,094,681 A | 7/2000 | Shaffer |
| 6,173,270 B1 | 1/2001 | Cristofich |
| 6,175,922 B1 | 1/2001 | Wang |
| 6,263,321 B1 | 7/2001 | Daughtery, III |
| 6,272,532 B1 | 8/2001 | Feinleib |
| 6,318,536 B1 | 11/2001 | Korman |
| 6,336,098 B1 | 1/2002 | Fortenberry |
| 6,370,514 B1 | 4/2002 | Messner |
| 6,381,582 B1 | 4/2002 | Walker |
| 6,390,472 B1 | 5/2002 | Vlnarsky |
| 6,393,269 B1 | 5/2002 | Hartmaier |
| 6,507,823 B1 | 1/2003 | Nel |
| 6,556,976 B1 | 4/2003 | Callen |
| 6,618,707 B1 | 9/2003 | Gary |
| 6,704,713 B1 | 3/2004 | Brett |
| 6,732,922 B2 | 5/2004 | Lindgren |
| 6,736,322 B2 | 5/2004 | Gobburu |
| 6,920,428 B2 | 7/2005 | Greene |
| 6,971,001 B1 | 11/2005 | Rolfs |
| 7,127,408 B2 | 10/2006 | Rosen |
| 7,206,755 B1 | 4/2007 | Muralidhar |
| 7,231,656 B1 | 6/2007 | Nathan |
| 7,257,552 B1 | 8/2007 | Franco |
| 7,313,539 B1 | 12/2007 | Pappas |
| 7,318,098 B2 | 1/2008 | Steinberg |
| 7,363,267 B1 | 4/2008 | Vincent et al. |
| 7,392,226 B1 | 6/2008 | Sasaki et al. |
| 7,552,393 B2 | 6/2009 | Hayes-Roth |
| 7,571,124 B2 | 8/2009 | Bodin |
| 7,610,220 B2 | 10/2009 | Cella et al. |
| 7,610,221 B2 | 10/2009 | Cella et al. |
| 7,660,751 B2 | 2/2010 | Cella et al. |
| 7,660,752 B2 | 2/2010 | Cella et al. |
| 7,752,116 B2 | 7/2010 | Ascher et al. |
| 7,865,424 B2 | 1/2011 | Pappas et al. |
| 7,962,375 B2 | 6/2011 | Pappas et al. |
| 7,996,292 B2 | 8/2011 | Pappas et al. |
| 8,032,447 B2 | 10/2011 | Pappas et al. |
| 8,229,841 B2 | 7/2012 | Pappas et al. |
| 8,301,550 B2 | 10/2012 | Pappas et al. |
| 8,463,765 B2 | 6/2013 | Lesavich |
| 8,543,450 B2 | 9/2013 | Pappas et al. |
| 2001/0032165 A1 | 10/2001 | Friend |
| 2002/0026403 A1 | 2/2002 | Tambay |
| 2002/0046137 A1 | 4/2002 | Odom |
| 2002/0052818 A1 * | 5/2002 | Loveland ................ 705/36 |
| 2002/0069150 A1 | 6/2002 | Ni |
| 2002/0183448 A1 | 12/2002 | Tibbitt et al. |
| 2002/0185414 A1 | 12/2002 | Morii |
| 2003/0009068 A1 | 1/2003 | Platz |
| 2003/0061110 A1 | 3/2003 | Bodin |
| 2003/0147789 A1 | 8/2003 | Adachi |
| 2003/0159889 A1 | 8/2003 | Johnson |
| 2003/0170453 A1 | 9/2003 | Foss |
| 2003/0183694 A1 | 10/2003 | Sayers |
| 2003/0199596 A1 | 10/2003 | Kolke |
| 2003/0204449 A1 | 10/2003 | Kotas |
| 2003/0208406 A1 | 11/2003 | Okamoto |
| 2003/0221438 A1 | 12/2003 | Rane |
| 2003/0226552 A1 | 12/2003 | Hewkin |
| 2003/0230529 A1 | 12/2003 | Austin |
| 2004/0000517 A1 | 1/2004 | Austin |
| 2004/0030616 A1 | 2/2004 | Florance |
| 2004/0072609 A1 | 4/2004 | Ungaro |
| 2004/0088242 A1 | 5/2004 | Ascher |
| 2004/0093225 A1 | 5/2004 | Bedner |
| 2004/0114960 A1 | 6/2004 | Kunou |
| 2004/0254818 A1 | 12/2004 | Rosen |
| 2005/0002741 A1 | 1/2005 | Brensinger |
| 2005/0039816 A1 | 2/2005 | Maguire |
| 2005/0051919 A1 | 3/2005 | Koike |
| 2005/0080520 A1 | 4/2005 | Kline et al. |
| 2005/0120715 A1 | 6/2005 | Labrador |
| 2005/0133466 A1 | 6/2005 | Bridges |
| 2005/0170115 A1 | 8/2005 | Tibbitt |
| 2005/0202865 A1 | 9/2005 | Kim |
| 2005/0205491 A1 | 9/2005 | Helm |
| 2005/0246225 A1 | 11/2005 | Jorgensen |
| 2005/0263633 A1 | 12/2005 | Vantrease |
| 2005/0268946 A1 | 12/2005 | Miles |
| 2006/0053030 A1 | 3/2006 | Nakamura |
| 2006/0059038 A1 | 3/2006 | Iuchi |
| 2006/0064573 A1 | 3/2006 | Rolfs |
| 2006/0064574 A1 | 3/2006 | Rolfs |
| 2006/0065610 A1 | 3/2006 | Giralico |
| 2006/0080819 A1 | 4/2006 | McAllister |
| 2006/0117625 A1 | 6/2006 | Peterson |
| 2006/0118469 A1 | 6/2006 | Bork |
| 2006/0178545 A1 | 8/2006 | Yang |
| 2006/0180518 A1 | 8/2006 | Kashikura |
| 2006/0271462 A1 | 11/2006 | Harmon |
| 2006/0277130 A1 | 12/2006 | Harmon |
| 2007/0066397 A1 | 3/2007 | Nammi |
| 2007/0178570 A1 | 8/2007 | Diz |
| 2007/0232982 A1 | 10/2007 | Jarmon |
| 2007/0291491 A1 | 12/2007 | Li |
| 2008/0021810 A1 | 1/2008 | Pappas |
| 2008/0091557 A1 | 4/2008 | Cella |
| 2008/0091558 A1 | 4/2008 | Cella |
| 2008/0091559 A1 | 4/2008 | Cella |
| 2008/0091560 A1 | 4/2008 | Cella |
| 2008/0091561 A1 | 4/2008 | Cella |
| 2008/0091562 A1 | 4/2008 | Cella |
| 2008/0091563 A1 | 4/2008 | Cella |
| 2008/0091564 A1 | 4/2008 | Cella |
| 2008/0091565 A1 | 4/2008 | Cella |
| 2008/0091566 A1 | 4/2008 | Cella |
| 2008/0091567 A1 | 4/2008 | Cella |
| 2008/0091568 A1 | 4/2008 | Cella |
| 2008/0091569 A1 | 4/2008 | Cella |
| 2008/0091570 A1 | 4/2008 | Cella |
| 2008/0097040 A1 | 4/2008 | Brown |
| 2008/0097868 A1 | 4/2008 | Cella |
| 2008/0097869 A1 | 4/2008 | Cella |
| 2008/0097870 A1 | 4/2008 | Cella |
| 2008/0103921 A1 | 5/2008 | Cella |
| 2008/0103922 A1 | 5/2008 | Cella |
| 2008/0103924 A1 | 5/2008 | Cella |
| 2008/0103925 A1 | 5/2008 | Cella |
| 2008/0103926 A1 | 5/2008 | Cella |
| 2008/0103927 A1 | 5/2008 | Cella |
| 2008/0103928 A1 | 5/2008 | Cella |
| 2008/0103929 A1 | 5/2008 | Cella |
| 2008/0103930 A1 | 5/2008 | Cella |
| 2008/0103931 A1 | 5/2008 | Cella |
| 2008/0103932 A1 | 5/2008 | Cella |
| 2008/0103933 A1 | 5/2008 | Cella |
| 2008/0109325 A1 | 5/2008 | Cella |
| 2008/0191909 A1 * | 8/2008 | Mak ........................ 341/95 |
| 2008/0215457 A1 | 9/2008 | Pappas |
| 2008/0215495 A1 | 9/2008 | Pappas |
| 2009/0006184 A1 | 1/2009 | Leach et al. |
| 2009/0036192 A1 | 2/2009 | Hughes |
| 2010/0094722 A1 | 4/2010 | Cella et al. |

(56) References Cited

U.S. PATENT DOCUMENTS

| | | |
|---|---|---|
| 2011/0131109 A1 | 6/2011 | Pappas et al. |
| 2011/0208710 A1 | 8/2011 | Lesavich |
| 2011/0301986 A1 | 12/2011 | Pappas et al. |
| 2011/0307279 A1 | 12/2011 | Pappas et al. |
| 2012/0078698 A1 | 3/2012 | Pappas et al. |
| 2012/0278622 A1 | 11/2012 | Lesavich et al. |
| 2013/0013384 A1 | 1/2013 | Pappas et al. |
| 2013/0096965 A1 | 4/2013 | Pappas et al. |
| 2013/0144726 A1 | 6/2013 | Pappas et al. |
| 2013/0191224 A1 | 7/2013 | Pappas et al. |
| 2013/0191244 A1 | 7/2013 | Pappas et al. |
| 2013/0191269 A1 | 7/2013 | Pappas et al. |
| 2013/0198009 A1 | 8/2013 | Pappas et al. |
| 2013/0198036 A1 | 8/2013 | Pappas et al. |
| 2013/0254003 A1 | 9/2013 | Pappas et al. |

OTHER PUBLICATIONS

PR_Newswire_1; "TWA introduces TWA Club 60 for senior citizens"; Jan 22, 1986; NYPR78, Supplier No. 04105692.*

PR_Newswire_2; "Travelers Indemnity to support International Capital Equipment in financial guarantees"; Jan. 6, 1984; NYPR38; Supplier No. 03089298.*

Business Wire; "(TVLY) Priceline.com, Travelpcity.com Marketing Alliance Launches"; Monday, Apr. 10, 2000, Document Type: Newswire.

PR_Newswire_1; "TWA introduces TWA Club 60 for senior citizens"; Jan. 22, 1986; NYPR78, Supplier No. 04105692.

PR Newswire 2; "Travelers Indemnity to support International Capital Equipment in financial guarantees"; Jan. 6, 1984; NYPR38; Supplier No. 03089298.

Partial PCT Search Report PCT/US2008/079,273 Dated: Dec. 8, 2008.

Partial PCT Search Report PCT/US2008/079,275 Dated: Dec. 24, 2008.

Estache, Antonio and Alexander, Ian, Infrastructure Restructuring and Regulation: Building a Base for Sustainable Growth (Sep. 1999). World Bank Policy Research Working Paper No. 2415.

* cited by examiner

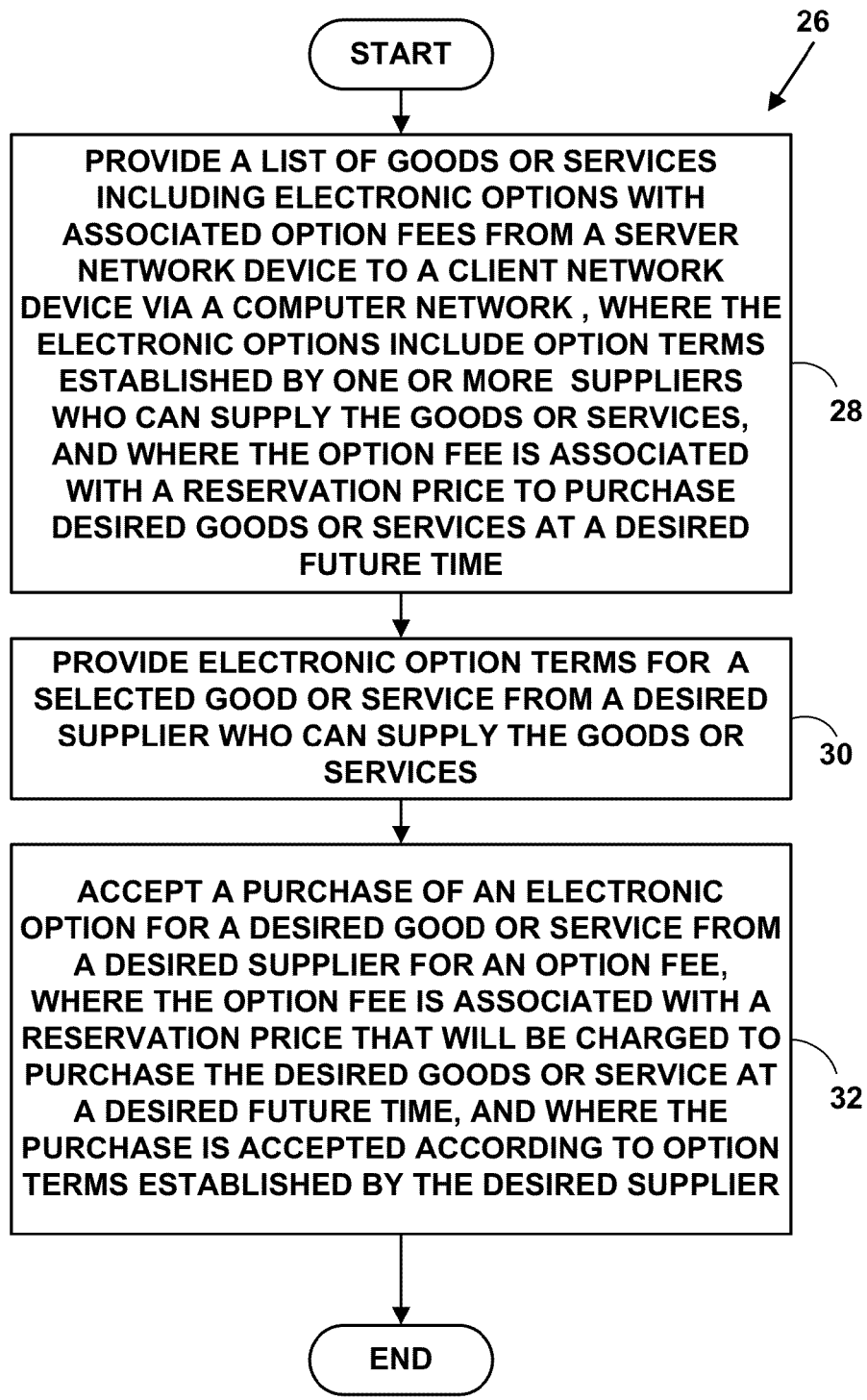

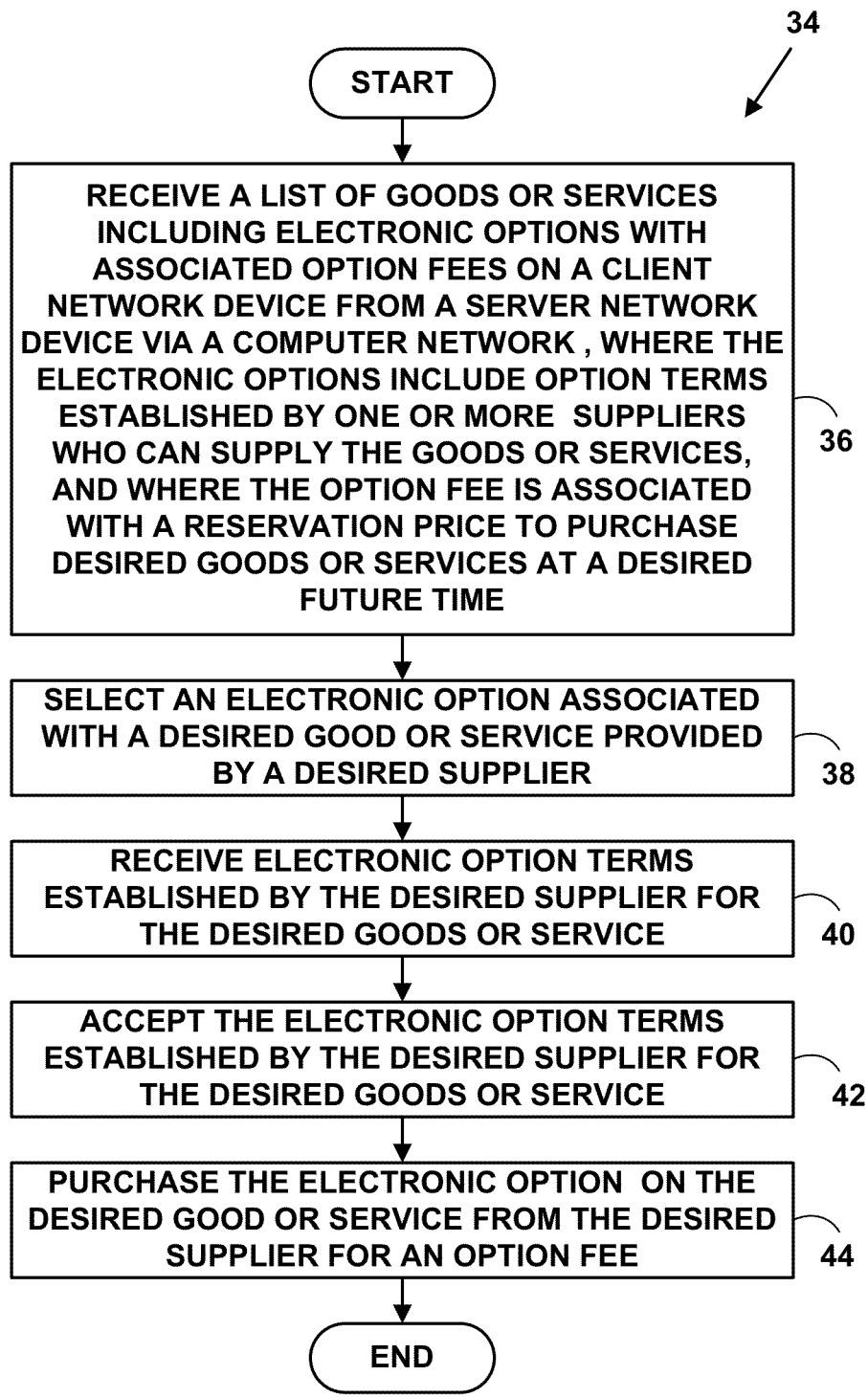

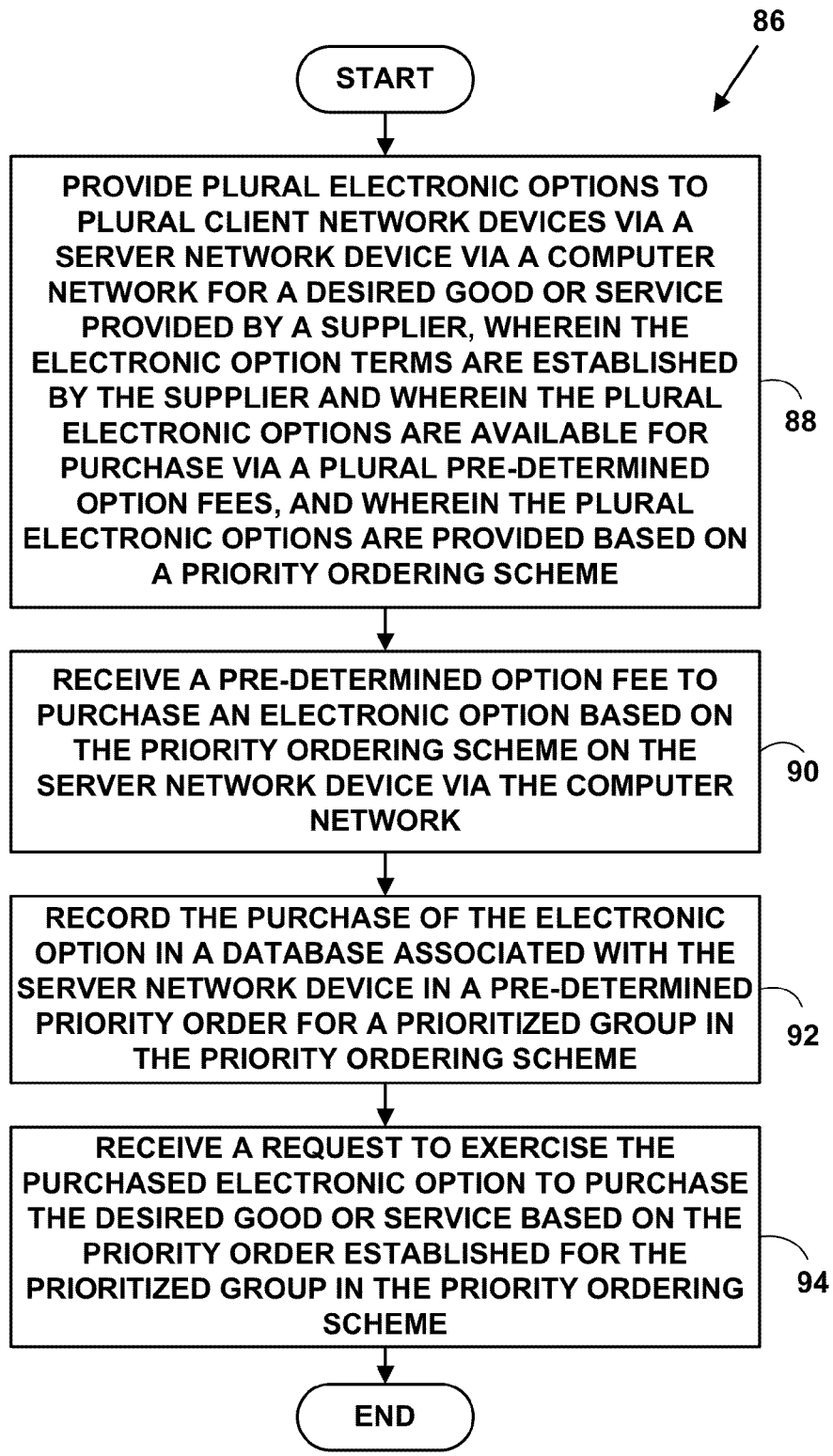

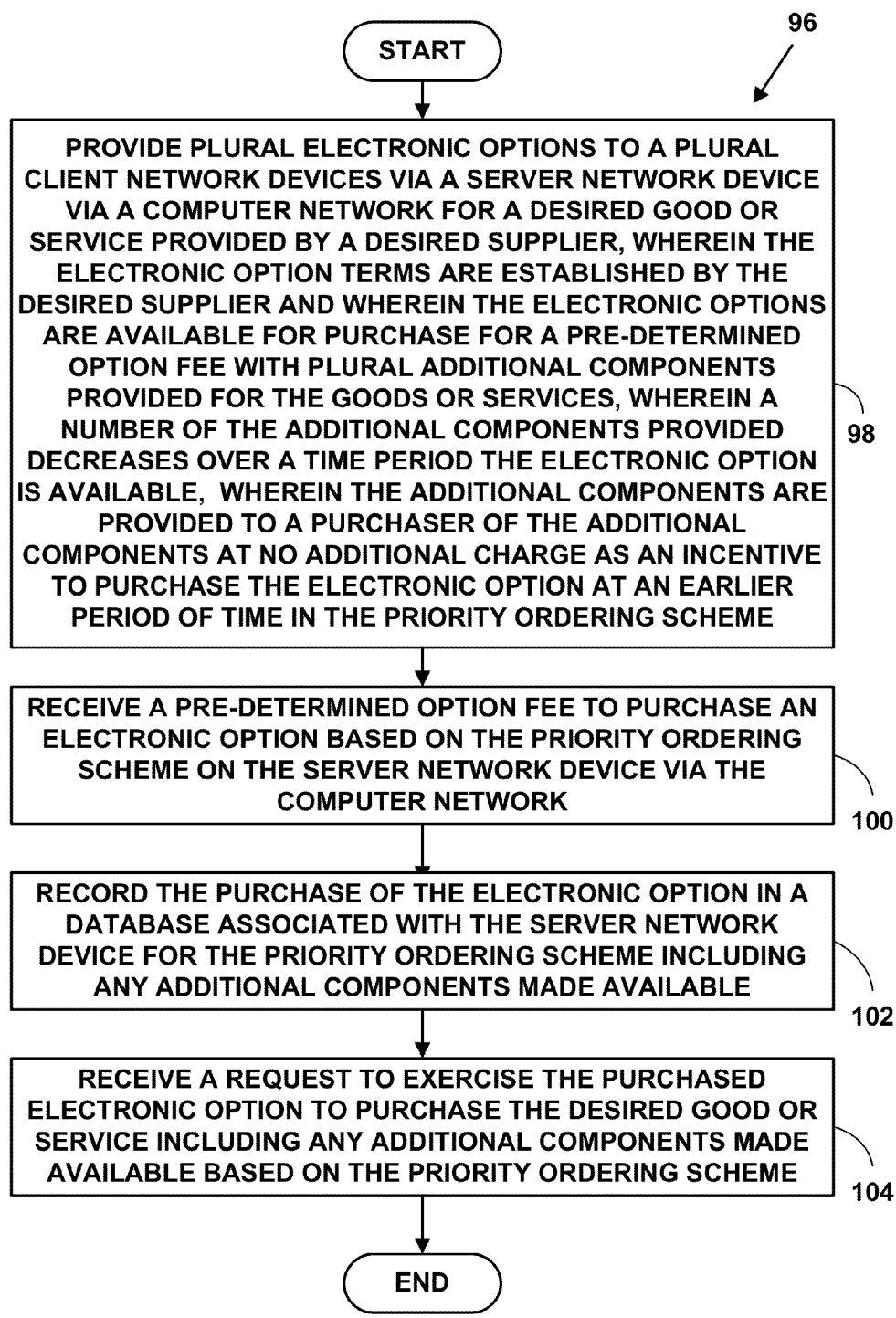

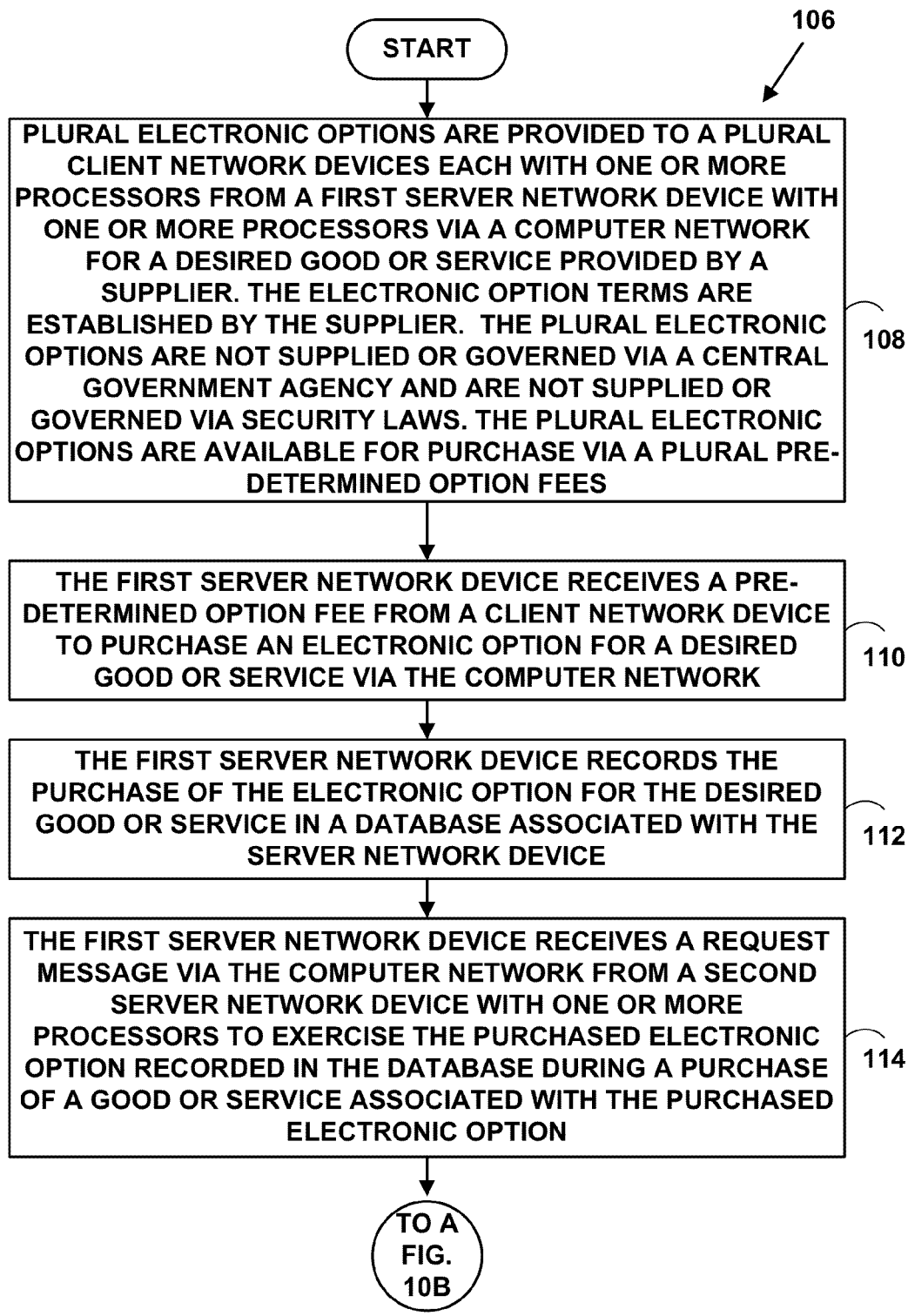

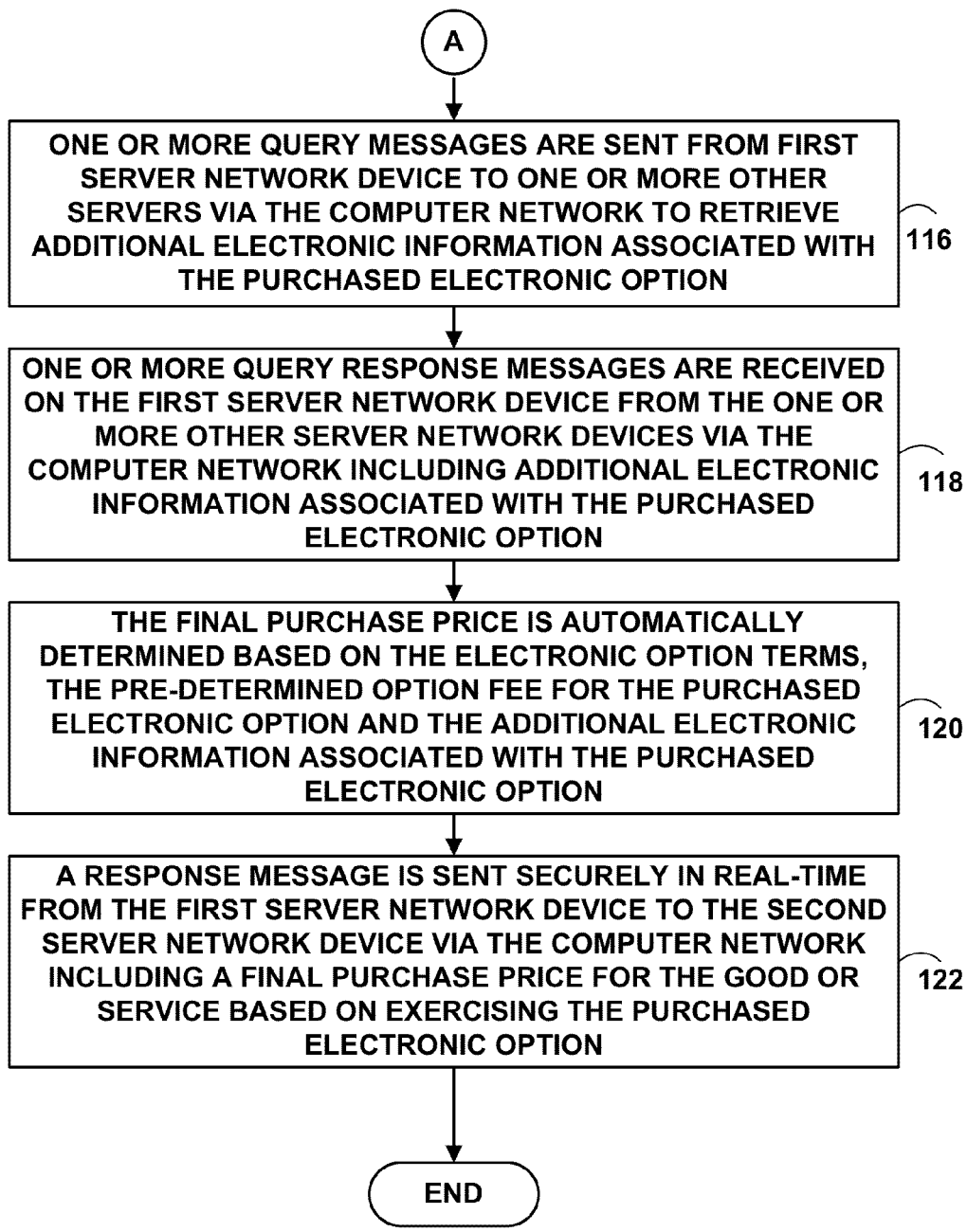

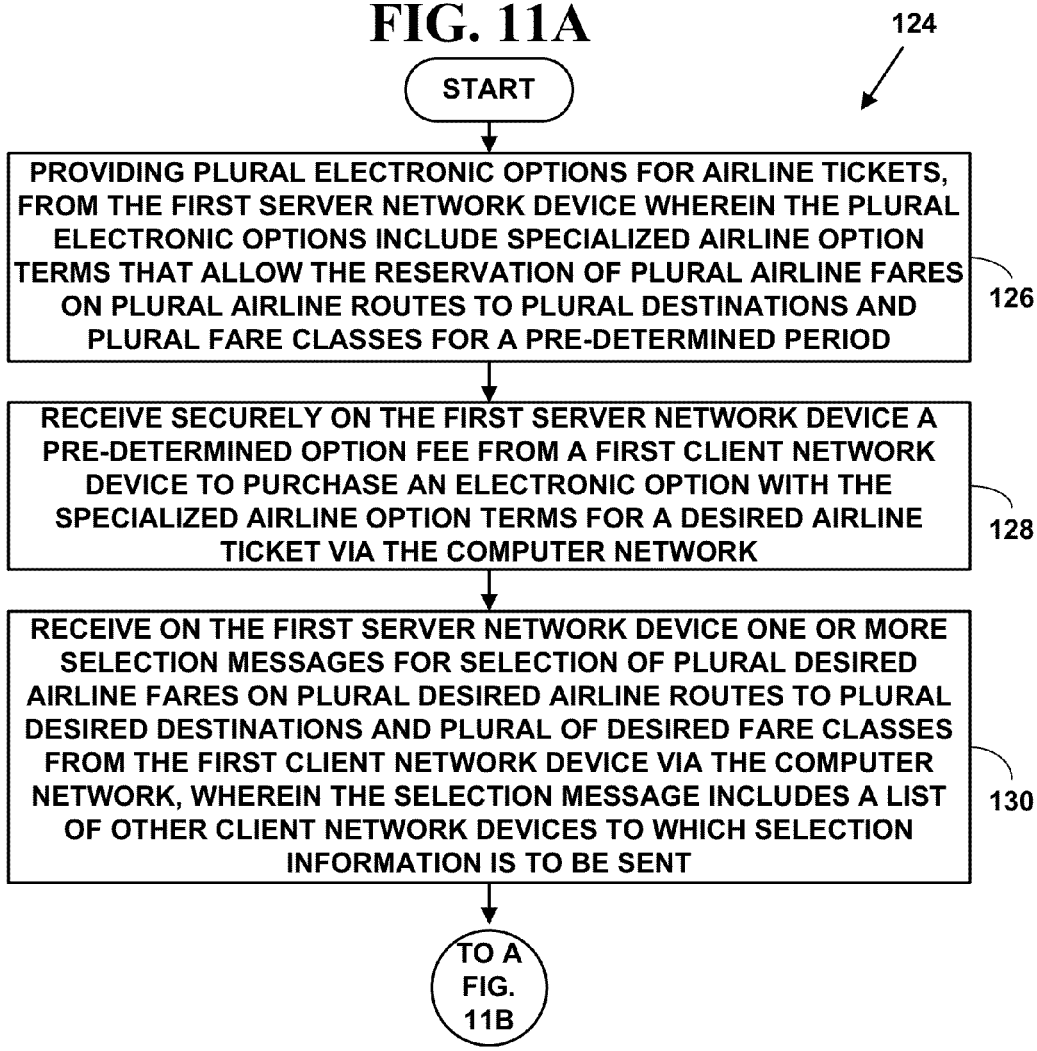

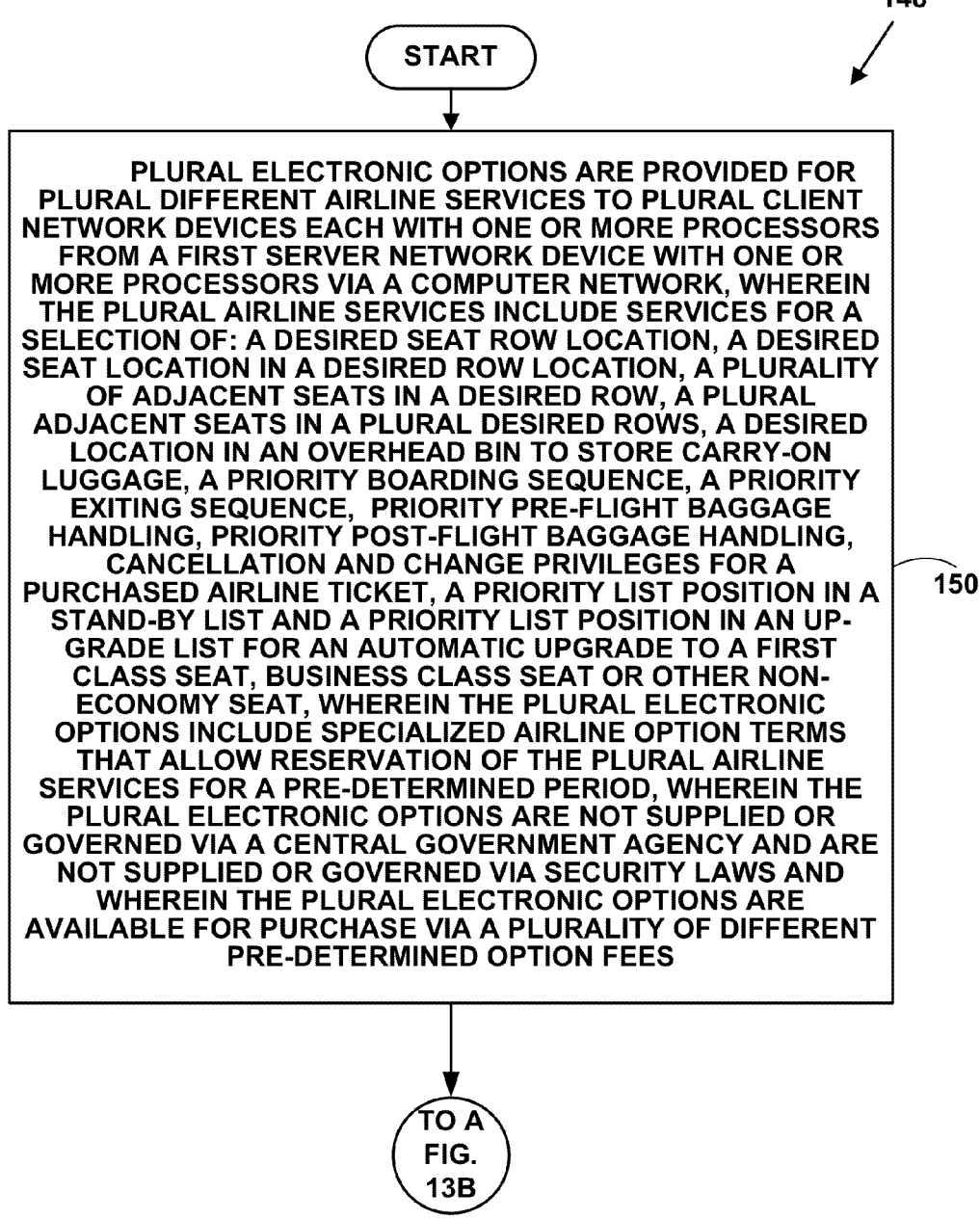

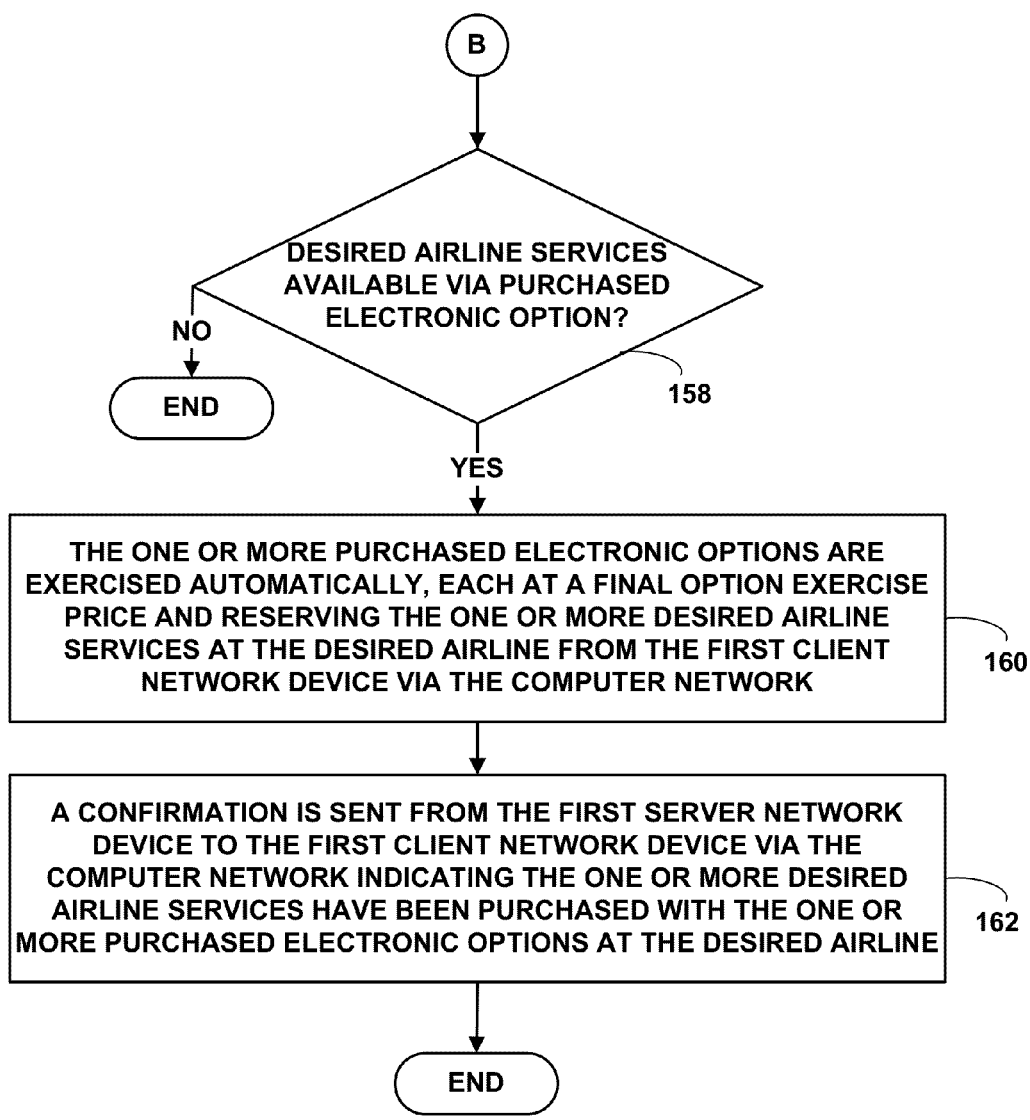

METHOD AND SYSTEM FOR RESERVING FUTURE PURCHASES OF GOODS OR SERVICES

CROSS REFERENCES TO RELATED APPLICATIONS

This U.S. application is a Continuation-In-Part (CIP) of U.S. application Ser. No. 13/190,892, filed Jul. 26, 2011, that issued at U.S. Pat. No. 8,301,550, on Oct. 30, 2012, which is a CIP of U.S. application Ser. No. 12/005,149, filed Dec. 21, 2007, that issued as U.S. Pat. No. 7,996,292 on Aug. 9, 2011, which is a CIP of U.S. application Ser. No. 09/566,671 filed on May 8, 2000, that issued as U.S. Pat. No. 7,313,539, on Dec. 25, 2007, the contents of all of which are incorporated by reference.

FIELD OF THE INVENTION

This invention relates to providing goods or services over a computer network. More specifically, this invention relates to providing electronic options for goods or services via a computer network such as the Internet or an intranet.

BACKGROUND OF THE INVENTION

The Internet has provided consumers a medium for shopping that is available twenty-four hours a day, seven days a week and 365 days a year. The Internet has also provided suppliers that ability to offer goods or services and receive orders from consumer in an automated, and potentially more cost-effective way.

There are many occasions for which a consumer may be interested in goods or services but not be able or willing to purchase the goods or services at the present time. For example, a supplier may be offering a new electronic component that may interest a consumer. The consumer may not presently have the money to purchase the new electronic component. However, the consumer may want to lock in a current favorable price or guaranty the availability of the electronic component. The consumer may also want to "lock-in" a desired price while he/she does comparison shopping on the electronic component at other locations.

As is known in the art, an option can be used to reserve a proprietary interest in an item at a future time. An option is typically a contract conveying a right to buy or sell a designated item at a specified time during a stipulated period. There are many examples of using options for financial instruments, such as stocks, bonds and other items known in the art. See for example, U.S. Pat. No. 6,049,783, entitled "Interactive Internet Analysis Method," U.S. Pat. No. 6,024,641, entitled "Method apparatus and system for lottery gaming," and U.S. Pat. No. 5,991,744, entitled "Method and apparatus that process financial data relating to wealth accumulations plans" U.S. Pat. No. 5,844,286, entitled "Apparatus and process for executing an expirationless option transaction," U.S. Pat. No. 5,671,363, entitled "Private stock option account control and exercise system," and others.

There are also examples of making conditional purchases known in the art. See for example, U.S. Pat. No. 6,041,308, entitled "System and method for motivating submission of conditional purchase offers," U.S. Pat. No. 6,012,045, entitled "Computer-based electronic bid auction and sale system," U.S. Pat. No. 5,897,620, entitled "Method and apparatus for the sale of airline-specified flight tickets," U.S. Pat. No. 5,297,031, entitled "Method and apparatus for order management by market brokers" and others.

However, there are several problems associated with using options known in the art to reserve a proprietary interest in a product at a future time. One problem is that unlike securities products (e.g., stocks, bonds, etc.) which are limited in number, there are far too many types of diverse products available on the Internet to logistically and effectively create one set of mutually agreeable contract terms for options to be used for such products.

Another problem is that options typically are created to protect a high-value, high-volume, high-risk products against price volatility. Price volatility is generally not large enough for most consumer or business products to use options. Without large price volatility, there is typically no incentive for a supplier to supply options for low volume, low margin, or low risk products.

Another problem is that options typically have uniform terms set by a central governing agency (e.g., the Security Exchange Commission). Such uniform terms are typically not suitable for an individual supplier of a product. A supplier may desire to provide his/her own option terms for specific products to help manage his/her inventory, risk or revenue.

Another problem is that the Internet and other computer networks have generic, everyday, consumer or business products available to consumers worldwide. However, options have typically not been available on such products.

Another problem is that suppliers may want to sell options on products that are not fully developed or don't even exist yet. Presently, option systems do not allow an option to be purchased for a product that does not exist or may never exist.

Another problem is that the Internet and other computer networks have provided the ability for suppliers to use new e-commerce business models to supply products. Options typically have not been used to support new e-commerce business models.

Another problem is that options typically have been used only for goods and not for services. A consumer may desire to purchase an option for a type of service (e.g., accounting services, a musical performer's services, an actor's services, etc.).

Another problem is that purchased electronic options typically have not been automatically exercised when a consumer purchases a good or service associated with the purchased electronic options.

Another problem is that purchased electronic options have not been used to temporarily reserve a variety of different airlines services offered by airlines.

Thus, it is desirable to provide a method for using options for goods or services that is available on a computer network, such as the Internet. The method should make it easy and convenient for a purchaser to buy an option on goods or services to reserve a right to purchase desired goods or services with option terms set by a supplier of the goods or services.

SUMMARY OF THE INVENTION

In accordance with preferred embodiments of the present invention, some of the problems associated with using options for goods or services are overcome. A method and system for reserving future purchases of goods or services using plural electronic options is presented.

The electronic options are used to reserve plural different types of airline services including, but not limited to, a selection of: a desired seat row location, a desired seat location in a desired row location, a plural adjacent seats in a desired row, a plural adjacent seats in a plural desired rows, a desired location in an overhead bin to store carry-on luggage, a priority boarding sequence, a priority exiting sequence, priority pre-flight baggage handling, priority post-flight baggage handling, cancellation and change privileges for a purchased airline ticket, a priority list position in a stand-by list and/or a priority list position for an automatic upgrade to a first class seat, business class seat or other non-economy seat and/or other airline services.

The foregoing and other features and advantages of a preferred embodiment of the present invention will be more readily apparent from the following detailed description. The detail description proceeds with references to accompanying drawings.

BRIEF DESCRIPTION OF THE DRAWINGS

Preferred embodiments of the present invention are described with reference to the following drawings, wherein:

FIG. 2 is a flow diagram illustrating a method for providing electronic options for goods and services from a server network device;

FIG. 3 is a flow diagram illustrating a method for requesting electronic options for goods and services from a client network device;

FIG. 8 is a flow diagram illustrating a method for providing electronic options for goods or services with a priority system;

FIG. 9 is a flow diagram illustrating a method for providing electronic options for goods or services with levels of components with a priority system;

FIGS. 10A and 10B are a flow diagram illustrating a method for providing automatic execution of electronic options during an electronic purchase transaction;

FIGS. 11A and 11B are a flow diagram illustrating a method for providing automatic execution of electronic options;

FIGS. 13A, 13B and 13C are a flow diagram illustrating a method for providing automatic execution of electronic options for airline services.

DETAILED DESCRIPTION OF PREFERRED EMBODIMENTS

Exemplary Electronic Option System

Figure 1:
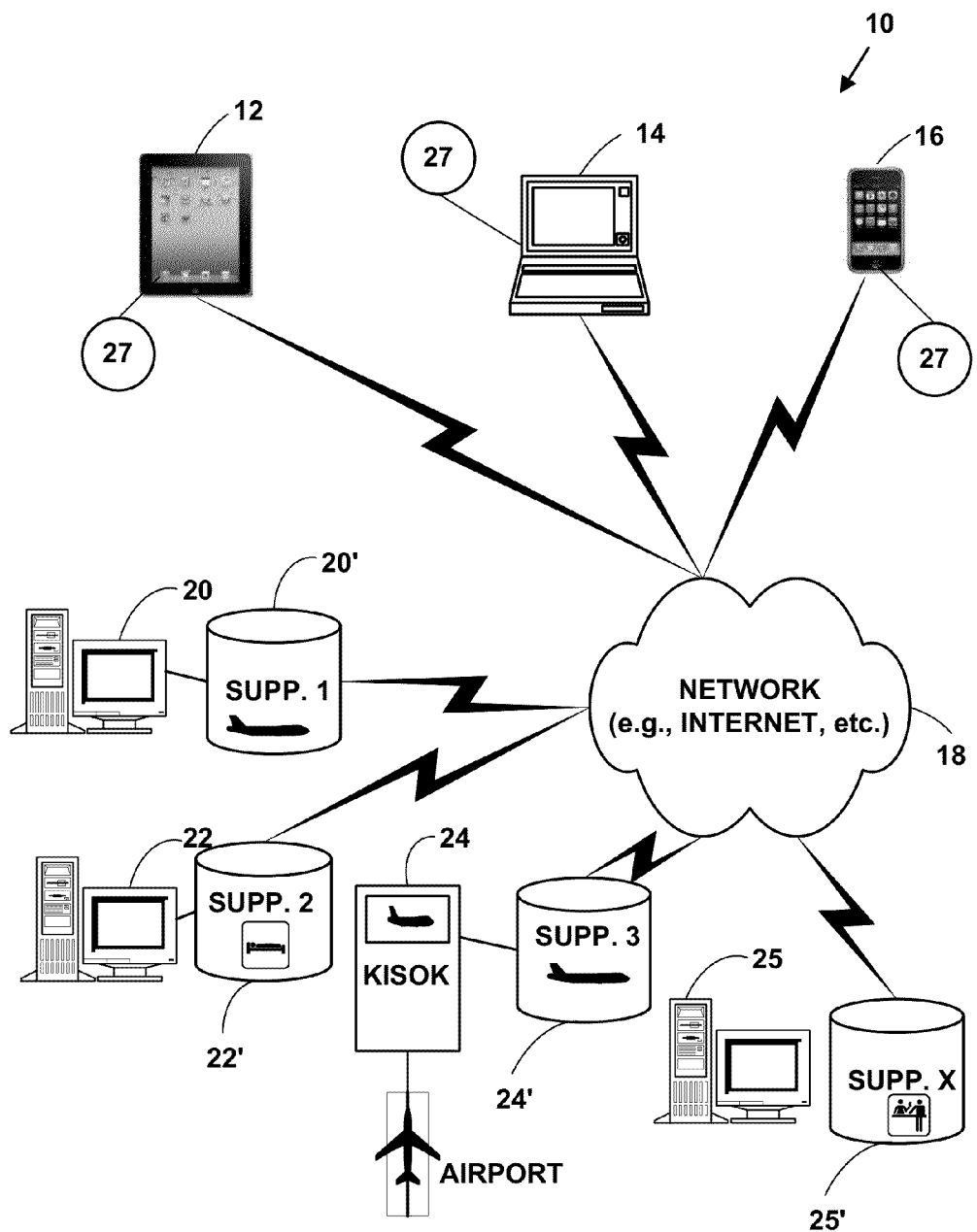
FIG. 1 is a block diagram illustrating an exemplary electronic option system.

FIG. 1 is a block diagram illustrating an exemplary electronic option system 10 for one exemplary embodiment of the present invention. The electronic option system 10 includes one or more client network devices 12, 14, 16 (only three of which are illustrated). The client network devices 12, 14, 16 include, but are limited to, personal computers, wireless telephones, personal information devices, personal digital assistants, hand-held devices, network appliances, and other types of electronic devices. The client network devices 12, 14, 16, included wireless and/or wired interfaces to a computer network 18. However, the present invention is not limited to these devices and more, fewer or equivalent types of client electronic devices can also be used.

The client network devices 12, 14, 16 are in communications with the computer network 18 (e.g., the Internet, intranet, etc.). The communication includes, but is not limited to, communications over a wire connected to the client network devices, wireless communications, and other types of communications via the wireless and/or wired interfaces.

The one or more client network devices 12, 14, 16 also include smart phones (e.g., 16, etc.) such as the iPhone by Apple, Inc., Blackberry Storm and other Blackberry models by Research In Motion, Inc. (RIM), Droid by Motorola, Inc. HTC, Inc. other types of smart phones, other types of mobile and non-mobile phones, etc. However, the present invention is not limited to such devices, and more, fewer or other devices can be used to practice the invention.

A "smart phone" is a mobile phone that offers more advanced computing ability and connectivity than a contemporary basic feature phone. Smart phones and feature phones may be thought of as handheld computers integrated with a mobile telephone, but while most feature phones are able to run applications based on platforms such as Java ME, a smart phone usually allows the user to install and run more advanced applications. Smart phones and/or tablet computers run complete operating system software providing a platform for application developers.

The operating systems include the iPhone OS, Android, Windows, etc. iPhone OS is a proprietary operating system for the Apple iPhone. Andriod is an open source operating system platform backed by Google, along with major hardware and software developers (such as Intel, HTC, ARM, Motorola and Samsung, etc.), that form the Open Handset Alliance.

The one or more client network devices 12, 14, 16 also include tablet computers (e.g., 12, etc.) such as the iPad, by Apple, Inc., the HP Tablet, by Hewlett Packard, Inc., the Playbook, by RIM, Inc., the Tablet, by Sony, Inc. However, the present invention is not limited to such devices, and more, fewer or other devices can be used to practice the invention.

The one or more client network devices 12, 14, 16 may also include a smart phone and/or tablet computer software "application" 27 to interface with the methods described herein.

Plural server network devices 20, 22, 24, 25 (only four of which are illustrated) with one or more associated databases (20', 22', 24', 25') include electronic option and/or pricing information for goods and services that may be supplied by plural suppliers (Supplier 1, Supplier 2, . . . Supplier X). However, the present invention is not limited to these components and more, fewer or other components can also be used to practice the invention.

The plural server network devices 20, 22, 24, 25 also include one or more interactive electronic kiosks each with one or more processors and a graphical user interface (GUI) (only one of which is illustrated 24) connected to the computer network 18 with a wired or wireless connection. "Interactive electronic kiosks" typically include network information terminals featuring specialized hardware and software designed within a public or private space that provides access to information and applications for communication, commerce, entertainment and education. A GUI is typically used to display information. Kiosk 24 includes electronic option information displayed on a GUI (e.g., see FIGS. 4 and 5, etc.) Plural kiosks 24 are placed in airports and includes software and hardware to practice the current invention for electronic options. The same kiosks 24 may also provide for the direct purchase of tickets of various kinds including airline tickets. However, the kiosks 24 are not required to provide for the direct purchase of tickets. However, the present invention is not limited to such interactive electronic kiosks and more, fewer or other types of interactive electronic kiosks can be used to practice the invention.

An operating environment for components of the electronic option system 10 for preferred embodiments of the present invention include a processing system with at least one high speed Central Processing Unit ("CPU") and/or processor and a memory. In accordance with the practices of persons skilled in the art of computer programming, the present invention is described below with reference to acts and symbolic representations of operations or instructions that are performed by the processing system, unless indicated otherwise. Such acts and operations or instructions are referred to as being "processor executed" or "computer-executed" or "CPU executed."

It will be appreciated that acts and symbolically represented operations or instructions include the manipulation of electrical signals or biological signals by the CPU. An electrical system or biological system represents data bits which cause a resulting transformation or reduction of the electrical signals or biological signals, and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to the data bits.

The data bits may also be maintained on a non-transitory computer readable medium including magnetic disks, optical disks, organic memory, and any other volatile (e.g., Random Access Memory ("RAM")) or non-volatile (e.g., Read-Only Memory ("ROM")) mass storage system readable by the CPU. The non-transitory computer readable medium includes cooperating or interconnected computer readable medium, which exist exclusively on the processing system or be distributed among multiple interconnected processing systems that may be local or remote to the processing system.

In one embodiment of the present invention, the wired and wireless interfaces include wired and wireless interfaces and corresponding networking protocols for wired connections to the computer network 18 including, a Public Switched Telephone Network (PSTN) or a cable television network (CATV) including HDTV that connect the network devices 12, 14, 16 via one or more twisted pairs of copper wires, digital subscriber lines (e.g. DSL, ADSL, VDSL, etc.) coaxial cable, fiber optic cable, other connection media or other wired connection interfaces. The PSTN is any public switched telephone network provided by AT&T, GTE, Sprint, MCI, SBC, Verizon and others.

The computer network 18 may also include a paging and wireless messaging network, a wireless cellular telephone network, a Packet Cellular Network (PCN), Global System for Mobile Communications, (GSM), Generic Packet Radio Services (GPRS), network/Personal Communications Services network (PCS), a Cellular Digital Packet Data (CDPD), Wireless Application Protocol (WAP), Digital Audio Broadcasting (DAB) network, Transmission Control Protocol (TCP)/User Datagram Protocol (UDP)/Internet Protocol (IP) network, or other types of computer networks.

The wireless cellular telephone network includes, but is not limited to Code Division Multiple Access (CDMA), Time Division Multiple Access (TDMA), or other wireless technologies.

As is known in the art, PCS networks include network that cover a range of wireless, digital communications technologies and services, including cordless phones, mobile phones, voice mail, paging, faxing, mobile personal digital/data assistants (PDAs), etc. PCS devices are typically divided into narrowband and broadband categories.

Narrowband devices, which operates in the 900 MHz band of frequencies, typically provide paging, data messaging, faxing, and one- and two-way electronic messaging capabilities. Broadband devices, which operate in the 1850 MHz to 1990 MHz range typically provide two-way voice, data, and video communications. Other wireless technologies such as GSM, CDMA and TDMA are typically included in the PCS category.

As is known in the art, GSM is another type of digital wireless technology widely used throughout Europe, in Australia, India, Africa, Asia, and the Middle East. GSM is gaining popularity in the United States. GSM is a wireless platform based on TDMA to digitize data. GSM includes not only telephony and Short Message Services (SMS) but also voice mail, call forwarding, fax, caller ID, Internet access, and e-mail.

As is known in the art, SMS is type of communications service that enables a user to allow private message communications with another user. GSM typically operates at three frequency ranges: 900 MHz (GSM 900) in Europe, Asia and most of the rest of the world; 1800 MHz (GSM 1800 or DCS 1800 or DCS) in a few European countries; and 1900 MHz (GSM 1900 also called PCS 1900 or PCS) in the United States. GSM also operates in a dual-band mode including 900/1800 Mhz and a tri-band mode include 900/1800/1900 Mhz.

As is known in the art, GPRS is a standard for wireless communications, which runs at speeds up to 150 kilo-bits-per-second ("kbit/s"). GPRS, which supports a wide range of bandwidths is an efficient use of limited bandwidth and is particularly suited for sending and receiving small bursts of data such as e-mail and Web browsing, as well as large volumes of data.

As is known in the art, CDPD is a wireless standard providing two-way, 19.2-Kbps or higher packet data transmission over existing cellular telephone channels. As is known in the art, a Packet Cellular Network (PCN) includes various types of packetized cellular data.

In one embodiment, of the invention, the wireless interfaces include WPAN wireless personal area network (WPAN) interfaces. As is known in the art, a WPAN is a personal area network for interconnecting devices centered around an individual person's devices in which the connections are wireless. A WPAN interconnects all the ordinary computing and communicating devices that a person has on their desk (e.g. computer, etc.) or carry with them (e.g., PDA, mobile phone, two-way pager, etc.)

Typically, a wireless personal area network uses some technology that permits communication only within about 10 meters. One such technology is "Bluetooth." Another such technology is "Zigbee."

A key concept in WPAN technology is known as "plugging in." In the ideal scenario, when any two WPAN-equipped devices come into close proximity (within several meters of each other) or within a few kilometers of a central server (not illustrated), they can communicate via wireless communications as if connected by a cable. WPAN devices can also lock out other devices selectively, preventing needless interference or unauthorized access to secure information.

In one embodiment of the present invention, the wireless interfaces include but are not limited to, an IEEE 802.11a, 802.11b, 802.11g, 802.11n, 802.15.4 (ZigBee), 802.16a, 802.16g, "Wireless Fidelity" (WiFi), "Worldwide Interoperability for Microwave Access" (WiMAX), ETSI High Performance Radio Metropolitan Area Network (HIPERMAN) "RF Home," or other types of wireless interfaces. However, the present invention is not limited to such wireless interface and other types of wireless interfaces can also be used.

In another embodiment of the present invention, the wireless mesh network device 14, 16, 18, 22 includes a wireless sensor device that comprises an integral or separate Bluetooth and/or infra data association (IrDA) module for wireless Bluetooth or wireless infrared communications.

As is known in the art, an 802.11b is a short-range wireless network standard. The IEEE 802.11b standard defines wireless interfaces that provide up to 11 Mbps wireless data transmission to and from wireless devices over short ranges. 802.11a is an extension of the 802.11b and can deliver speeds up to 54M bps. 802.11g deliver speeds on par with 802.11a. However, other 802.11xx interfaces can also be used and the present invention is not limited to the 802.11 protocols defined. The IEEE 802.11a, 802.11b and 802.11g standards are incorporated herein by reference.

As is known in the art, WiFi is a type of 802.11xx interface, whether 802.11b, 802.11a, dual-band, etc. WiFi devices include an RF interfaces such as 2.4 GHz for 802.11b or 802.11g and 5 GHz for 802.11a. More information on Wi-Fi can be found at the URL "www.weca.net."

As is known in the art, 802.15.4 (Zigbee) is low data rate network standard used for mesh network devices such as sensors, interactive toys, smart badges, remote controls, and home automation. The 802.15.4 standard provides data rates of 250 kbps, 40 kbps, and 20 kbps., two addressing modes; 16-bit short and 64-bit IEEE addressing, support for critical latency devices, such as joysticks, Carrier Sense Multiple Access/Collision Avoidance, (CSMA-CA) channel access, automatic network establishment by a coordinator, fully handshaked protocol for transfer reliability, power management to ensure low power consumption for multi-month to multi-year battery usage and up to 16 channels in the 2.4 GHz Industrial, Scientific and Medical (ISM) band (Worldwide), 10 channels in the 915 MHz (US) and one channel in the 868 MHz band (Europe). The IEEE 802.15.4-2003 standard is incorporated herein by reference. More information on 802.15.4 and ZigBee can be found at the URL "www.ieee802.org" and "www.zigbee.org" respectively.

As is known in the art, WiMAX is an industry trade organization formed by leading communications component and equipment companies to promote and certify compatibility and interoperability of broadband wireless access equipment that conforms to the IEEE 802.16XX and ETSI HIPERMAN. HIPERMAN is the European standard for metropolitan area networks (MAN).

The IEEE The 802.16a and 802.16g standards are wireless MAN technology standard that provides a wireless alternative to cable, DSL and T1/E1 for last mile broadband access. It is also used as complimentary technology to connect IEEE 802.11XX hot spots to the Internet.

The IEEE 802.16a standard for 2-11 GHz is a wireless MAN technology that provides broadband wireless connectivity to fixed, portable and nomadic devices. It provides up to 50-kilometers of service area range, allows users to get broadband connectivity without needing direct line of sight with the base station, and provides total data rates of up to 280 Mbps per base station, which is enough bandwidth to simultaneously support hundreds of businesses with T1/E1-type connectivity and thousands of homes with DSL-type connectivity with a single base station. The IEEE 802.16g provides up to 100 Mbps.

The IEEE 802.16e standard is an extension to the approved IEEE 802.16/16a/16g standard. The purpose of 802.16e is to add limited mobility to the current standard which is designed for fixed operation.

The ESTI HIPERMAN standard is an interoperable broadband fixed wireless access standard for systems operating at radio frequencies between 2 GHz and 11 GHz.

The IEEE 802.16a, 802.16e and 802.16g standards are incorporated herein by reference. More information on WiMAX can be found at the URL "www.wimaxforum.org." WiMAX can be used to provide a WLP.

The ETSI HIPERMAN standards TR 101 031, TR 101 475, TR 101 493-1 through TR 101 493-3, TR 101 761-1 through TR 101 761-4, TR 101 762, TR 101 763-1 through TR 101 763-3 and TR 101 957 are incorporated herein by reference. More information on ETSI standards can be found at the URL "www.etsi.org." ETSI HIPERMAN can be used to provide a WLP.

As is known in the art, Bluetooth is a short-range radio frequency technology aimed at simplifying communications among network devices and between network devices. Bluetooth wireless technology supports both short-range point-to-point and point-to-multipoint connections. The Bluetooth Specification, GL 11r02, March 2005, prepared by the Bluetooth SIG, Inc. is incorporated herein by reference.

In one embodiment, network devices 12, 14, 16, 20, 22, 24, 25, include wired and wireless interfaces including the NICs include "4G" components. As is known in the art "4G" refers to the fourth generation of wireless communications standards and speeds of 100 megabits/second to gigabits/second or more. It is a successor to 3G and 2G standards. The nomenclature of the generations generally refers to a change in the fundamental nature of the service. The first was the move from analogue (1G) to digital (2G) transmission. This was followed by multi-media support, spread spectrum transmission and at least 200 kbits/second (3G). The 4G NICs include IP packet-switched NICs, wired and wireless ultra-broadband (i.e., gigabit speed) access NICs, Worldwide Interoperability for Microwave Access (WiMAX) NICs and multi-carrier transmission NICs. However, the present invention is not limited to this embodiment and 1G, 2G and 3G and/or any combination thereof, with or with 4G NICs can be used to practice the invention.

As is known in the art, IP is an addressing protocol designed to route traffic within a network or between networks. For more information on IP see IETF RFC-791 incorporated herein by reference.

TCP provides a connection-oriented, end-to-end reliable protocol designed to fit into a layered hierarchy of protocols that support multi-network applications. For more information on TCP see RFC-793, incorporated herein by reference.

UDP provides a connectionless mode of communications with datagrams in an interconnected set of networks. For more information on UDP see ITEF RFC-768 incorporated herein by reference.

Security and Encryption

Devices and interfaces of the present invention include plural security and/or encryption methods for secure communications via the computer network 18. Wireless Encryption Protocol (WEP) (also called "Wired Equivalent Privacy) is a security protocol for WiLANs defined in the IEEE 802.11b standard. WEP is cryptographic privacy algorithm, based on the Rivest Cipher 4 (RC4) encryption engine, used to provide confidentiality for 802.11b wireless data.

As is known in the art, RC4 is cipher designed by RSA Data Security, Inc. of Bedford, Mass., which can accept encryption keys of arbitrary length, and is essentially a pseudo random number generator with an output of the generator being XORed with a data stream to produce encrypted data.

One problem with WEP is that it is used at the two lowest layers of the OSI model, the physical layer and the data link layer, therefore, it does not offer end-to-end security. One another problem with WEP is that its encryption keys are static rather than dynamic. To update WEP encryption keys, an individual has to manually update a WEP key. WEP also typically uses 40-bit static keys for encryption and thus provides "weak encryption," making a WEP device a target of hackers.

The IEEE 802.11 Working Group is working on a security upgrade for the 802.11 standard called "802.11i." This supplemental draft standard is intended to improve WiLAN security. It describes the encrypted transmission of data between systems 802.11X WiLANs. It also defines new encryption key protocols including the Temporal Key Integrity Protocol (TKIP). The IEEE 802.11i draft standard, version 4, completed Jun. 6, 2003, is incorporated herein by reference.

The 802.11i is based on 802.1x port-based authentication for user and device authentication. The 802.11i standard includes two main developments: Wireless or Wi-Fi Protected Access (WPA) and Robust Security Network (RSN).

WPA uses the same RC4 underlying encryption algorithm as WEP. However, WPA uses TKIP to improve security of keys used with WEP. WPA keys are derived and rotated more often than WEP keys and thus provide additional security. WPA also adds a message-integrity-check function to prevent packet forgeries.

RSN uses dynamic negotiation of authentication and selectable encryption algorithms between wireless access points and wireless devices. The authentication schemes proposed in the draft standard include Extensible Authentication Protocol (EAP). One proposed encryption algorithm is an Advanced Encryption Standard (AES) encryption algorithm.

Dynamic negotiation of authentication and encryption algorithms lets RSN evolve with the state of the art in security, adding algorithms to address new threats and continuing to provide the security necessary to protect information that WiLANs carry.

The NIST developed a new encryption standard, the Advanced Encryption Standard (AES) to keep government information secure. AES is intended to be a stronger, more efficient successor to Triple Data Encryption Standard (3DES). More information on NIST AES can be found at the URL "www.nist.gov/aes."

As is known in the art, DES is a popular symmetric-key encryption method developed in 1975 and standardized by ANSI in 1981 as ANSI X.3.92, the contents of which are incorporated herein by reference. As is known in the art, 3DES is the encrypt-decrypt-encrypt (EDE) mode of the DES cipher algorithm. 3DES is defined in the ANSI standard, ANSI X9.52-1998, the contents of which are incorporated herein by reference. DES modes of operation are used in conjunction with the NIST Federal Information Processing Standard (FIPS) for data encryption (FIPS 46-3, October 1999), the contents of which are incorporated herein by reference.

The NIST approved a FIPS for the AES, FIPS-197. This standard specified "Rijndael" encryption as a FIPS-approved symmetric encryption algorithm that may be used by U.S. Government organizations (and others) to protect sensitive information. The NIST FIPS-197 standard (AES FIPS PUB 197, November 2001) is incorporated herein by reference.

The NIST approved a FIPS for U.S. Federal Government requirements for information technology products for sensitive but unclassified (SBU) communications. The NIST FIPS Security Requirements for Cryptographic Modules (FIPS PUB 140-2, May 2001) is incorporated herein by reference.

As is known in the art, RSA is a public key encryption system which can be used both for encrypting messages and making digital signatures. The letters RSA stand for the names of the inventors: Rivest, Shamir and Adleman. For more information on RSA, see U.S. Pat. No. 4,405,829, now expired, incorporated herein by reference.

As is known in the art, "hashing" is the transformation of a string of characters into a usually shorter fixed-length value or key that represents the original string. Hashing is used to index and retrieve items in a database because it is faster to find the item using the shorter hashed key than to find it using the original value. It is also used in many encryption algorithms.

Secure Hash Algorithm (SHA), is used for computing a secure condensed representation of a data message or a data file. When a message of any length$<2^{64}$ bits is input, the SHA-1 produces a 160-bit output called a "message digest." The message digest can then be input to other security techniques such as encryption, a Digital Signature Algorithm (DSA) and others which generates or verifies a security mechanism for the message. SHA-512 outputs a 512-bit message digest. The Secure Hash Standard, FIPS PUB 180-1, Apr. 17, 1995, is incorporated herein by reference.

Message Digest-5 (MD-5) takes as input a message of arbitrary length and produces as output a 128-bit "message digest" of the input. The MD5 algorithm is intended for digital signature applications, where a large file must be "compressed" in a secure manner before being encrypted with a private (secret) key under a public-key cryptosystem such as RSA. The IETF RFC-1321, entitled "The MD5 Message-Digest Algorithm" is incorporated here by reference.

As is known in the art, providing a way to check the integrity of information transmitted over or stored in an unreliable medium such as a wireless network is a prime necessity in the world of open computing and communications. Mechanisms that provide such integrity check based on a secret key are called "message authentication codes" (MACS). Typically, message authentication codes are used between two parties that share a secret key in order to validate information transmitted between these parties.

Keyed Hashing for Message Authentication Codes (HMAC), is a mechanism for message authentication using cryptographic hash functions. HMAC is used with any iterative cryptographic hash function, e.g., MD5, SHA-1, SHA-512, etc. in combination with a secret shared key. The cryptographic strength of HMAC depends on the properties of the underlying hash function. The IETF RFC-2101, entitled "HMAC: Keyed-Hashing for Message Authentication" is incorporated here by reference.

As is known in the art, an Electronic Code Book (ECB) is a mode of operation for a "block cipher," with the characteristic that each possible block of plaintext has a defined corresponding cipher text value and vice versa. In other words, the same plaintext value will always result in the same cipher text value. Electronic Code Book is used when a volume of plaintext is separated into several blocks of data, each of which is then encrypted independently of other blocks. The Electronic Code Book has the ability to support a separate encryption key for each block type.

As is known in the art, Diffie and Hellman (DH) describe several different group methods for two parties to agree upon a shared secret in such a way that the secret will be unavailable to eavesdroppers. This secret is then converted into various types of cryptographic keys. A large number of the variants of the DH method exist including ANSI X9.42. The IETF RFC-2631, entitled "Diffie-Hellman Key Agreement Method" is incorporated here by reference.

However, the present invention is not limited to the security or encryption techniques described and other security or encryption techniques can also be used.

As is known in the art, the HyperText Transport Protocol (HTTP) Secure (HTTPs), is a standard for encrypted communications on the World Wide Web. HTTPs is actually just HTTP over a Secure Sockets Layer (SSL). For more information on HTTP, see IETF RFC-2616 incorporated herein by reference.

As is known in the art, the SSL protocol is a protocol layer which may be placed between a reliable connection-oriented network layer protocol (e.g. TCP/IP) and the application protocol layer (e.g. HTTP). SSL provides for secure communication between a source and destination by allowing mutual authentication, the use of digital signatures for integrity, and encryption for privacy.

The SSL protocol is designed to support a range of choices for specific security methods used for cryptography, message digests, and digistal signatures. The security method are negotiated between the source and destingation at the start of establishing a protocol session. The SSL 2.0 protocol specification, by Kipp E. B. Hickman, 1995 is incorporated herein by reference. More information on SSL is available at the URL See "netscape.com/eng/security/SSL_2.html."

As is known in the art, Transport Layer Security (TLS) provides communications privacy over the Internet. The protocol allows client/server applications to communicate over a transport layer (e.g., TCP) in a way that is designed to prevent eavesdropping, tampering, or message forgery. For more information on TLS see IETF RFC-2246, incorporated herein by reference.

In one embodiment, the security functionality includes Cisco Compatible EXtensions (CCX). CCX includes security specifications for makers of 802.11xx wireless LAN chips for ensuring compliance with Cisco's proprietary wireless security LAN protocols. As is known in the art, Cisco Systems, Inc. of San Jose, Calif. is supplier of networking hardware and software, including router and security products.

Providing Electronic Options for Goods and Services from a Server Network Device FIG. 2 is a flow diagram illustrating a Method 26 for providing electronic options for goods and services. At Step 28, a server network device provides to a client network device via a computer network, a list of available goods or services including plural electronic options with associated option fees for the goods or services. The plural electronic options include electronic option terms established by one or more suppliers who can supply the goods or services. An option fee is associated with a reservation price to purchase desired goods or services at a desired future. At Step 30, electronic option terms for a selected good or service for a desired supplier who can supply the selected good or service are provided. At Step 32, a purchase of an electronic option for an option fee for a desired good or service for a desired supplier is accepted on the server network device. The purchase of the electronic option is accepted according to electronic option terms established by the desired supplier. A confirmation for purchase of the electronic option for the option fee is provided to the client network device. Information about the electronic option is stored in a database associated with the server network device.

In one embodiment, the electronic options do not have uniform terms set or regulated by any central governing agencies (e.g., Security Exchange Commission (SEC), Commodities Future Trading Commission (CFTC), etc.) such as those used for stocks, bonds, commodities, financial instruments, etc. The electronic options also do not have uniform option terms as is used for the sale or purchase of real estate or other standard agreements used for other legal purposes (e.g., a lease, etc.) other than those specifically included in the option terms created by a supplier of a good and/or service. Instead a supplier of goods and/or services provides his/her own option terms for specific goods and/or services to help manage his/her inventory, risk or revenue.

In one embodiment, the electronic options are used for existing generic, everyday, consumer or business goods available to consumers worldwide (e.g., consumer electronics, tickets to events, airline tickets, other airline services, automobiles, toys, etc.). In one embodiment, the electronic options are sold for products that are not fully developed or don't even exist yet and may never exist. Presently, option systems do not allow an option to be purchased for a product that does not exist or may never exist. In one specific embodiment, the electronic options are used for tickets to current and future events. However, the present invention is not limited to such a specific embodiment and other embodiments with other goods can also be used to practice the invention.

In one embodiment, the electronic option includes an option for a type of service (e.g., professional athlete services, accounting services, a musical performer's services, an actor's services, etc.), instead of for an actual good.

In one embodiment, the electronic option terms obligate the electronic option holder to purchase the good or service at the time of expiration of the electronic option. In another embodiment, the electronic option terms obligate the option holder to purchase the good and/or service upon first availability of the good or service. In one embodiment, the electronic option holder is not obligated to purchase the good or service at the time of expiration of the electronic option.

In another embodiment, the electronic option terms include a conditional event that obligates the option holder to purchase the good or service upon successful completion of the conditional event and/or by a specified date after completion of the conditional event. For example, suppose the conditional event is for is for a ticket to sporting event that may or may not happen, such as a sporting team making post-season playoff or championship games. In another embodiment, the electronic option terms obligate the option holder to purchase the good and/or service by a specified date after the conditional event occurs.

For the vendor or broker of conditional electronic options for tickets, the right or obligation is an electronic option term that they can set based on the value or perceived demand for each event. Low overall demand, such as for an event such as a quarterfinals game in a small market might include the requirement that the owner of record of the electronic option on a given date must purchase the ticket. In contrast, a high demand event such as the Super Bowl where a vendor or broker of tickets might have no problem collecting the electronic option fee and then still being able to easily sell the ticket on the secondary market.

In another embodiment the electronic option terms include a conditional event that does not obligate the option holder to purchase the good and/or service upon successful completion of the conditional event.

In one embodiment, the electronic option terms set by the vendor or broker or consumer specify that if the goods and/or services do not become available by a pre-determined date or conditional event, a portion of the option price will be refunded. The portion of the option price refunded could be greater than, less than, or equal to the price paid for the option.

In another embodiment, the electronic option terms set by the vendor or broker or consumer specify that if the goods and/or services do not become available by a pre-determined date or conditional event, a substitute good and/or service is made available that may be of greater, less than or equal value to the original product at a price that is greater, less than, or equal to the original exercise price of the option In one embodiment, the electronic options are used for existing generic, everyday, consumer or business products available to consumers worldwide. In one embodiment, the electronic options are sold for products that are not fully developed or don't even exist yet and may never exist. Presently, option systems do not allow an option to be purchased for a product that does not exist or may never exist.

In one embodiment, the electronic option includes an option for a type of service (e.g., professional athlete services, accounting services, a musical performer's services, an actor's services, etc.), instead of for an actual good.

Method 26 and a computer network 18 such as the Internet allows a supplier to supply options for virtually any good or service based on his/her own terms. The electronic options may be used for low price, low volume, low margin, or low risk products. The goods may include virtually any consumer or business products (e.g., toys, electronic devices, etc.). The services may include virtually any services (e.g., accounting services, a musical performer's services, an actor's services, etc.).

In one embodiment of the present invention, the list of goods and services with plural electronic options provided at Step 28 includes a "counter" that includes a number of available options for a desired goods or services. In such an embodiment, the counter may count down to zero in real-time as electronic options are purchased.

In one embodiment of the present invention, a supplier may desire to desire to provide an electronic option only on desired products, but not all products. The electronic options can be used to better manage inventory, risk or revenues.

In one embodiment of the present invention, a supplier is a "vendor." In such an embodiment, a vendor allows electronic options to be purchased for goods or services the vendor creates, manufactures, etc. In another embodiment of the present invention, a supplier is a "broker." In such an embodiment, a broker obtains desired goods or services from one or more other vendors, but does not create the desired goods or services. In another embodiment of the present invention, a supplier is both a vendor and a broker depending on the goods or services offered. In such an embodiment, the supplier will act as a vendor for a first portion of goods or services provided and also act as a broker for a second portion of goods or services provided. For example, a supplier may act as a vendor to sell it's own goods, but may also act as a broker for other goods from other suppliers.

In one embodiment of the present invention, the list of plural electronic options with associated option fees is provided from one central location on a computer network. In another embodiment of the present invention, the list of plural electronic options with associated option fees is provided from multiple distributed locations on a computer network.

When an electronic option is purchased, a purchaser is sent periodic reminders about the electronic options until the electronic option expires at the desired future time. The periodic reminders can be sent electronically, such as with electronic mail, ("e-mail") or sent in other electronic or non-electronic formats (e.g., a post card in regular mail).

A list of purchase prices for the goods or services is typically provided along with the list of electronic options. This allows a purchaser to either directly purchase desired goods or services or potentially defer a purchase to a desired time in the future by purchasing an electronic option on desired goods or services.

In another embodiment of the present invention, electronic options may be made available other suppliers who supply similar goods or services. A fee will typically be charged to a supplier who may request a list of purchasers of electronic options. In such an embodiment, the electronic options may be made available only if the purchaser gives his/her permission.

In another embodiment of the present invention, the electronic options may be made available to other suppliers based on the electronic option terms set by a supplier. Making the electronic options available to other suppliers allows the other suppliers to send additional offers for similar goods or services directly to a purchaser of an electronic option. The additional offers may include similar goods or services or goods or services with additional or enhanced features or functionality. The offers may also include sale items that may be purchased instead of the desired goods or services reserved with the electronic option.

In one embodiment of the present invention, a purchaser is allowed to exercise the electronic option at any time before the desired future time to purchase the desired goods or services at the reservation price. In another embodiment of the present invention, the purchaser is only allowed to exercise the option when the desired future time arrives.

In one embodiment of the present invention, a supplier may sell electronic options on goods or services that are not fully developed or don't even exist yet. Purchasing interest in such electronic options could be used to determine the economic feasibility of continuing to develop such a product or used to determine final pricing and features for a desired good or service. In another embodiment of the present invention, a supplier may use electronic options to support new e-business models.

In another embodiment of the present invention, an electronic option can purchased for an event that may never happen. For example, an option service may provide electronic options for World Series tickets for all major league baseball teams before the season starts. Only two teams will play in the World Series. However, a purchaser is able to purchase an option to buy World Series tickets for any team, even those that team may not play in the World Series.

In another embodiment of the present invention, the option terms established by a supplier may indicate purchasing an electronic option with a lower option fee will only guarantee a purchaser an X % (e.g., 50%) chance that the desired goods or services will be available at all at the desired future time. The option terms may also indicate that purchasing an electronic option with a higher option fee will guarantee a purchaser a Y % (e.g., 99%) chance that the desired goods or services will be available at the desired future time. In such an embodiment, paying an option fee does not guarantee that desired goods or services will be available for a purchaser.

In another embodiment of the present invention, the electronic option may include a volatility factor and a range of reservation prices. The volatility factor may cause an actual price paid for desired goods or services at a desired future time to be greater than the reservation price reserved by a purchaser. For example, an electronic option with a volatility factor may be made available for goods or services including a new toy, a new electronic product, tickets for sporting events, concerts, etc. The electronic option may include a volatility factor since the demand for the goods or services is uncertain, but demand may eventually exceed supply based on a scenario of conditions.

In one embodiment, the reservation price may be zero. In such an embodiment, xxx If an electronic option with a volatility factor is purchased for goods or services at a reservation price, and the demand for the goods or services is weak, the purchaser will be able purchase the goods or services at the reservation price at the future time if the purchaser so desires. If demand for the goods or services is strong, and the purchaser may be required to purchase the goods or services at a higher price than the reservation price if the purchaser still desires to actually purchase the goods or services.

In one embodiment of the present invention, an electronic option fee may be determined, in part, by electronic option terms input by a purchaser. An individual supplier may also provide different types of electronic options to different individual users based on their current or previous interactions.

In another embodiment of the present invention, the electronic option is a "personalized electronic coupon" dynamically created by a server network device and sent to a client network device based on current or previous input from a user. In such an embodiment, a purchaser of the option may also input one or more desired options terms to create his/her own personalized electronic coupon. The personalized electronic coupon is governed by the electronic options terms determined by a desired supplier and/or by the purchaser.

An electronic option is sold for an option fee that is typically set as a small percentage of the reserved purchase price (e.g., 1% to 25%). A purchaser is risking a small amount of money to potentially purchase desired goods or services at a reservation price at a desired future time. The reservation price is typically lower than a regular price charged for the goods and services.

However, the electronic option does not obligate a purchaser to actually purchase the desired goods or services for the reservation price at the desired future time. A purchaser may choose not to exercise the electronic option. As a result, the purchaser only loses a small amount of money that was paid to buy the electronic option (i.e., the option fee). The supplier may make a small amount of money from each electronic option that was not exercised and is typically able to sell the optioned goods or services to other purchasers.

In one specific embodiment of the present invention, the option fee may be determined by one or more of the electronic option factors illustrated in Table 1. However, the present invention is not limited to an electronic option using the electronic option factors illustrated in Table 1, and equivalent or other types of electronic options factors can also be used.

TABLE 1

| Electronic Option Factor | Description |
|---|---|
| S | A factor relating to a selected strike price (i.e., a price at which an optioned good or service may be purchased). The strike price may be zero. |
| D | A factor relating to a selected time period an option is valid for (i.e., a number of days) |
| V | A factor relating to a standard deviation in an average price volatility of a good or service. |

TABLE 1-continued

| Electronic Option Factor | Description |
|---|---|
| L | A factor relating to a list price of the product. |
| BE | A factor relating to a distributor's break even point of a good or service. |
| LAP | A factor relating to a lowest available sales price for the good or service that can be obtained with comparison shopping. |
| NR | A factor relating to a possible non-availability of the good or service upon option exercise. |
| DIS | A factor relating to a discounting toward a break even point |

In one embodiment of the present invention, determining an option fee for an electronic option is illustrated with Equations 1, 2 and 3 using the electronic option factors from Table 1. However, the present invention is not limited to calculation of an option fee as is illustrated in Equations 1, 2 and 3 and other or equivalent option formulas may be used to calculate the option fee. In addition, Equations 1, 2 and 3 may be combined into one equation, or further split into additional equations, and the present invention is not limited to calculating an option fee for an electronic option using three equations.

$$(LAP*(1+V)-S)=A \quad (1)$$

$$A-(DIS*(LAP*(1+V)-BE))=SUM \quad (2)$$

$$(SUM+(NR*S))*(D/365+1)=\text{ELECTRONIC OPTION FEE} \quad (3)$$

For example, suppose a user desired to purchase an electronic option for a 60 day time period on a Digital Video Disk ("DVD") player with a list price of $200 and a reservation price of $170. Table 2 illustrates exemplary values for electronic option factors from Table 1 used to determine an exemplary electronic option fee charged at Step 32 by a supplier. Table 3 illustrates the use of the electronic option factors from Table 2 in Equations 1, 2 and 3.

TABLE 2

| Electronic Option Factor | Description |
|---|---|
| S | $170 |
| D | 60 |
| V | 0.05 |
| L | $200 |
| BE | $160 |
| LAP | $180 |
| NR | 0.01 |
| DIS | 0.5 |

TABLE 3

| | |
|---|---|
| $180 * (1 + 0.05) − $170 = $19.00 | (1) |
| $19.00 − (0.5 * ($189 − $160)) = $4.50 | (2) |
| ($4.50 + (0.01 * $170)) * (60/365 + 1) = $7.22 | (3) |

As is illustrated in Table 3, a purchaser would pay $7.22 option fee for an electronic option to buy a DVD player within 60 days. The electronic option gives the purchaser a right to pay a total price of $177.22 ($170+$7.22) for the DVD player that sells for a list price of $200, if the electronic option is exercised. Otherwise, the purchaser risked only $7.22 for 60 days to potentially "reserve" a DVD player for purchase. This example assumes that the lowest possible price a purchaser could find the DVD player anywhere else by comparison shopping would be $180 (i.e., the LAP price), if the DVD player was available from a supplier when the purchaser desired the DVD player. Thus, the purchaser can actually reserved the DVD player, guarantee the DVD player would be available for 60 days, and save $2.78 for the lowest available offered price for the DVD layer ($180–177.22) with wasting time shopping for a lower price.

The option fee is set by a supplier to make the electronic options attractive to a purchaser, and help convince a purchaser that it is not necessary to spend any of his or her own time to try and find a lower price for desired goods or services.

In one embodiment of the present invention, all of the option fee is paid to an electronic option service that provided the electronic option information. In another embodiment of the present invention, a first portion of the option fee is paid to an electronic option service that provided the electronic information. A second portion of the option fee is paid to the desired supplier who can provide the desired good or service. For example, for an option fee of $7.22, the option service may collect $0.22 and the desired supplier may collect $7.00. The option service collects a small fee for each electronic option purchased for providing the electronic option service. The desired supplier collects a larger fee for taking the risk to potentially supply the desired good or service. In another embodiment of the present invention, all of the option fee is paid to the desired supplier who can provide the desired good or service.

In another embodiment of the present invention, an option service may be paid a small percentage of the option fee as well as a percentage of a purchase price for every good or service that is actually purchased by exercising an electronic option. For example, a option service may be paid 5% of the option fee as well as 2% of the actual purchase price of the good or service. In another embodiment of the present invention, all of the option fee may be paid to a supplier, while the option service may be paid only a percentage of a purchase price for an exercise electronic option on a good or service.

These embodiments are illustrative only. Virtually any type of option fee or purchase price sharing can be used with the present invention.

Requesting Electronic Options for Goods and Services from a Client Network Device FIG. 3 is a flow diagram illustrating a Method 34 for requesting electronic options for goods and services from a client network device. At Step 36, a list of available goods or services including plural electronic options with associated option fees for the goods or services, is received from a server network device on a client network device via a computer network. The plural electronic options include electronic option terms established by one or more suppliers who can supply the goods or services. An option fee is associated with a reservation price to purchase desired goods or services at a desired future time. At Step 38, an electronic option associated with a desired good or service provided by a desired supplier is selected. At Step 40, electronic option terms established by the desired supplier for the desired good or service are received on the client network device. At Step 42, the electronic option terms for the desired good or service are accepted on the client network device. At Step 44, the electronic option is purchased on the desired good or service provided by the desired supplier based on the accepted electronic option terms established by the desired supplier for an option fee. A confirmation for purchasing the electronic option is received from the server network device on the client network device.

In one embodiment of the present invention, the electronic option terms established by the desired supplier for the desired good or service received on the client network device include a request for a user to enter personal information (e.g., name, address, phone number, e-mail address, etc.) that is used to associate a user with a desired electronic option.

In one embodiment of the present invention, the confirmation includes an indication of the option fee paid for the electronic option, an expiration date for the electronic option, the reservation price and the desired supplier. In another embodiment of the present invention, the confirmation includes the information listed in the previous sentence as well as other information such as the LAP price, etc.

Figure 4A:
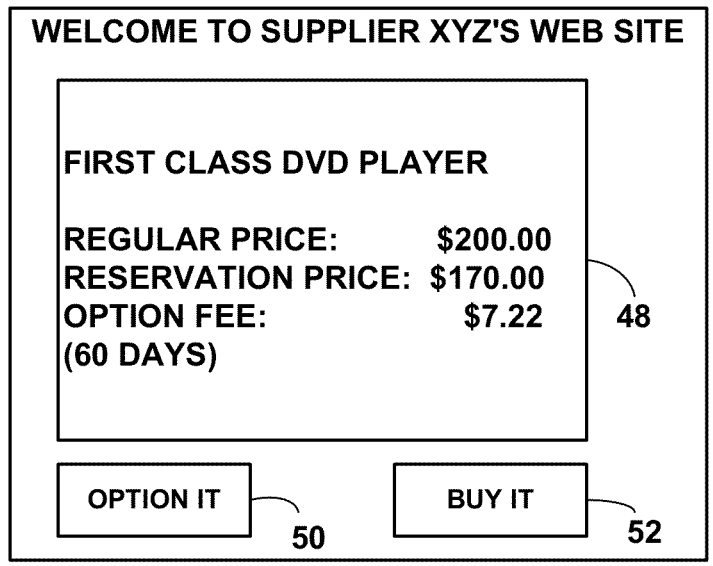
FIGS. 4A, 4B and 4C are block diagrams visually illustrating the methods of FIG. 2 and FIG. 3.
Figure 4B:
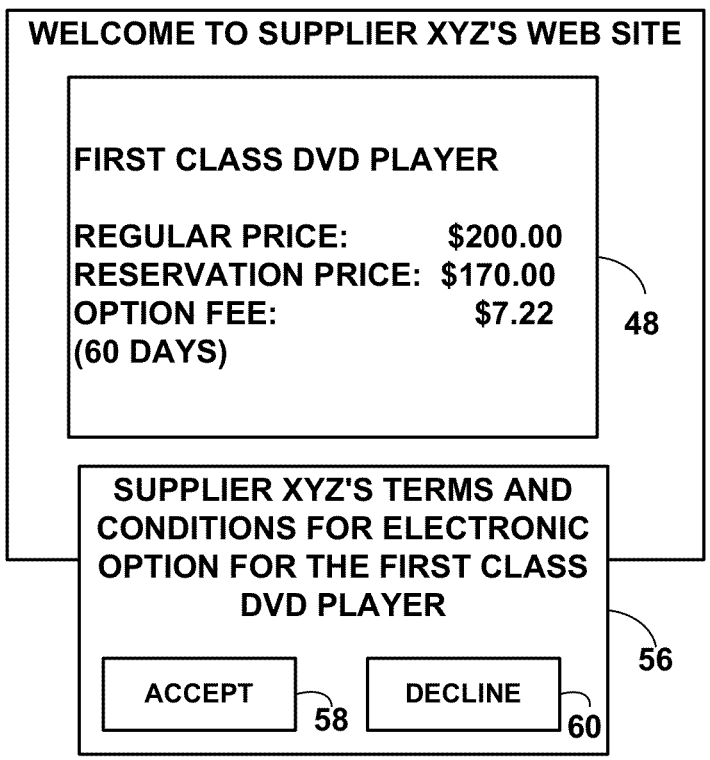
Figure 4C:
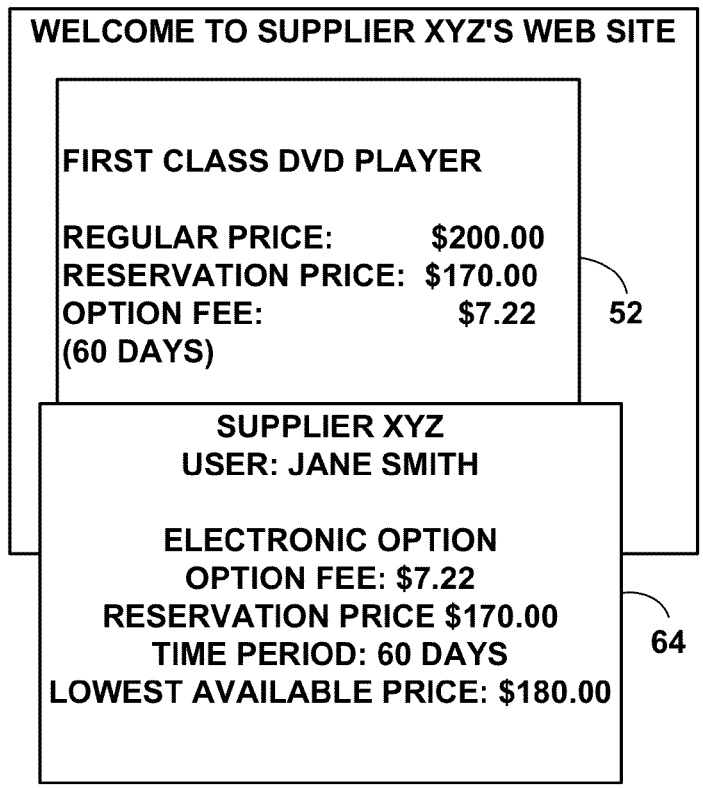

The interaction between Methods 26 and 34 are illustrated with one specific exemplary embodiment of the present invention. However, the present invention is not limited to this specific exemplary embodiment and other embodiments can also be used with Methods 26 and 34. FIGS. 4A, 4B and 4C are block diagrams 46, 54, 62 visually illustrating the interactions between Methods 26 and 34.

In such a specific embodiment of the present invention, at Step 28 (FIG. 2) the server network device 24 provides to a client network device 16 via the Internet 18, a list of available goods and electronic options with associated option fees. At Step 36 (FIG. 3), the client network device 16 receives the list of available goods and electronic options with associated option fees from the server network device 24 via the Internet 18. In this example, FIG. 4A illustrates a list 48 of DVD players currently being offered by Supplier XYZ. The list 48 includes an electronic option with associated option fee for the "First Class" DVD player. The DVD player is currently being sold for $200. An electronic option can be purchased for 60 days for an option fee of $7.22 to allow the DVD player to be purchased at a reservation price of $170.

At Step 38 (FIG. 3) an electronic option associated with the DVD player provided by Supplier XYZ is selected from the client network device 16. In this example, the electronic option is selected by selecting the "OPTION IT" button 50 (FIG. 4A). However, the present invention is not limited to selecting an electronic option with this method and other methods can also be used. The DVD player can also be purchased directly for $200 by selecting the "BUY IT" button 52 (FIG. 4C).

At Step 30 (FIG. 2) electronic option terms 56 (FIG. 4B) for the selected First Class DVD player from the Supplier XZY are provided from the server network device 24 to the client network device 16. At Step 40 (FIG. 3), the electronic option terms 56 (FIG. 4B) are received on the client network device 16. At Step 42 (FIG. 3), the electronic option terms 60 for the DVD player are accepted on the client network device 16. In this example, the electronic option terms are accepted by selecting the "ACCEPT" button 58 (FIG. 4B). However, the present invention is not limited to selecting electronic option terms with this method and other methods can also be used. A user can also decline to accept the electronic option terms by selecting the "DECLINE" button 60 (FIG. 4B). If a user declines to accept the electronic option terms provided by the Supplier XYZ, the electronic option can not be purchased.

At Step 44 (FIG. 3), the electronic option is purchased on the DVD player based on the accepted electronic option terms 56 established by Supplier XYZ for an option fee of $7.22. The reservation price for the DVD player is $170. At Step 32 (FIG. 2) the electronic option purchased for the DVD played accepted on the server network device 24 according to electronic option terms established by the Supplier XYZ. The electronic option information is stored in a database associated with the server network device 24.

A confirmation for purchase of the electronic option for the option fee is provided to the client network device 16 from the server network device 24. A confirmation 64 (FIG. 4C) for purchasing the electronic option is received from the server network device 24 on the client network device 16. In this example, the confirmation 64 (FIG. 4C) includes an indication of the supplier (Supplier XYZ), user (Jane Smith), option fee paid ($7.22), reservation price ($170), time period (60 days) and current LAP price ($180). However, the present invention is not limited to a confirmation with this information, and more, fewer or equivalent confirmation information items can also be used.

In one embodiment of the present invention, a user who purchases an electronic option can access electronic option information from a client network device via the computer network 18. In such an embodiment, a user would be provided a method to securely obtain electronic option information (e.g., a login and password, etc.). In one embodiment of the present invention, a central server network device is used to store electronic option information for all suppliers.

In another embodiment of the present invention, electronic option information is stored on one or more server network devices for individual suppliers who provide the desired goods or services for which the electronic option was purchased. In another embodiment of the present invention, the electronic option information can be obtained from both a central server network device as well as from the one or more server network devices for individual suppliers who provide the desired goods or services for which the electronic option was purchased.

Figure 5:
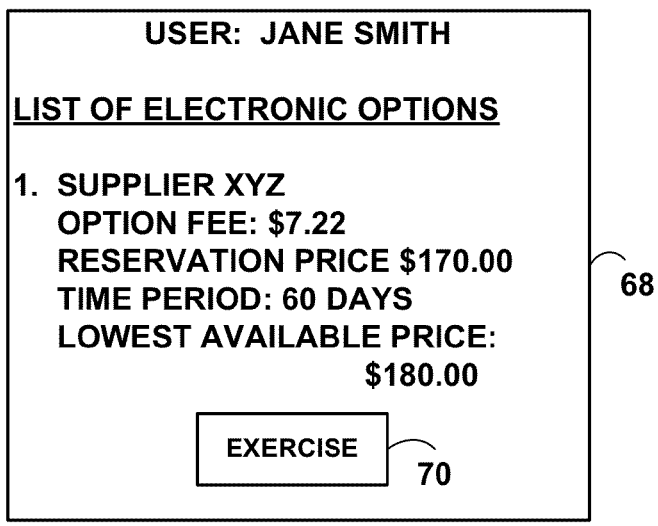
FIG. 5 is a block diagram illustrating exemplary electronic option confirmation information for the electronic option of FIG. 4C.

FIG. 5 is a block diagram 66 illustrating exemplary electronic option information 64 for the electronic option of FIG. 4C. In this example, the electronic option information includes an "EXERCISE" button 70 that allows a user to immediately exercise the electronic option and obtain the DVD player for a reservation price of $170. Since the electronic option information is provided electronically (i.e., via a computer network), when a user selects the EXERCISE button 70, the desired good may then be automatically shipped directly the purchaser without further input from the purchaser.

In one embodiment of the present invention, Method 34 can be used by purchase managers to proactively reserve goods or services that will be needed at a future time for a known reservation price. Method 34 not only provides a method to aid future planning for resources and/or budgets, but also provides a method to allow non-executive staff to efficiently assist executive staff in a business organization. For example, if a manufacturer knows that it typically must purchase four machine presses per year because of normal wear and tear, a purchase manager could purchase four electronic options on the presses in January or each year. Thus, the purchase manager has effectively authorized the purchase of four presses at the reservation price.

When a press breaks down and needs to be replaced, an electronic option for a press could be exercised at the reservation price. Since the purchase manager has purchased the electronic options for a pre-determined reservation price, a low-level assistant could actually exercise the electronic option and obtain the press without input from the purchase manager.

Use of Electronic Option Information by Desired Suppliers

Figure 6:
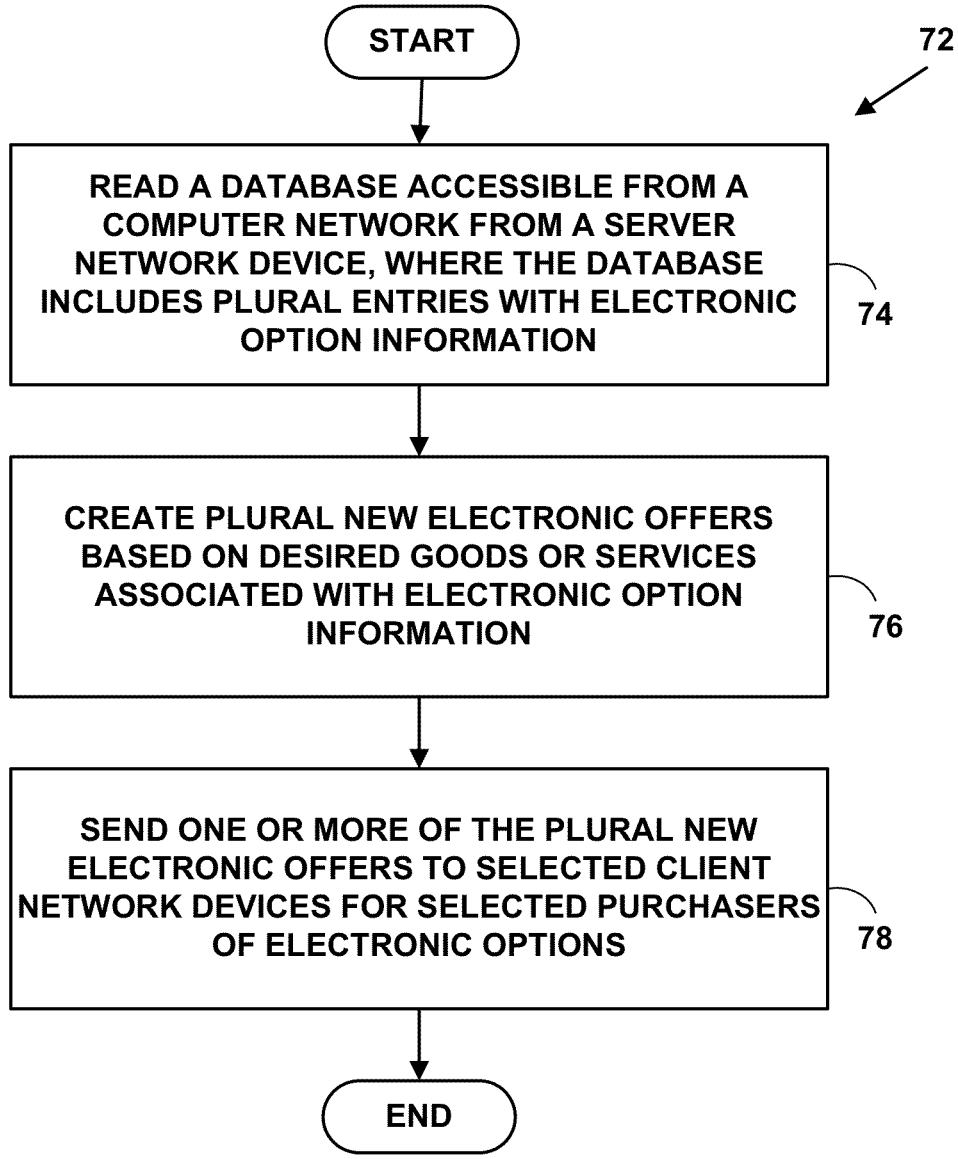
FIG. 6 is a flow diagram illustrating a method for using electronic options by desired supplier.

FIG. 6 is a flow diagram illustrating a Method 72 for using electronic options by a desired supplier. At Step 74, a database accessible from a computer network is read from a server network device. The database includes plural entries with electronic option information. At Step 76, plural new electronic offers are created based on desired goods or services associated with the electronic option information. At Step 78, one or more of the plural new electronic offers are sent to selected client network devices for selected purchasers of electronic options.

Method 72 allows a desired supplier who was willing to accept an electronic option for a desired good or service to try and sell other items to a purchaser of an electronic option. For example, if a purchaser had purchased an electronic option on a DVD player from a desired supplier, the desired supplier may send the purchaser offers to buy DVD disks for the DVD player. Method 72 may also allow a desired supplier to alert a purchaser of sale items. Method 72 may also allow a desired supplier to coax a purchaser to exercise an electronic option by sending offers to remind the purchaser to purchase the desired good or service at the reservation price or a price below the reservation price. Method 72 may help a desired supplier better manage inventories of goods or better manage services.

Use of Electronic Option Information by Other Suppliers

Figure 7:
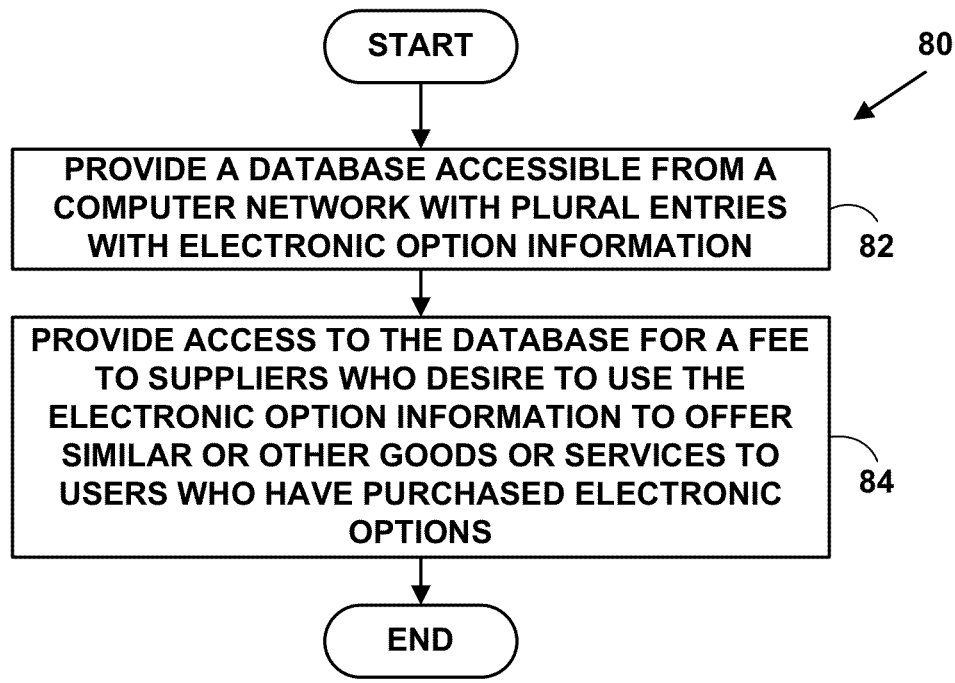
FIG. 7 is a flow diagram illustrating a method for using electronic options by other suppliers.

FIG. 7 is a flow diagram illustrating a Method 80 for using electronic options by other suppliers. At Step 82, a database accessible from a computer network including a plurality of entries with electronic option information is provided. At Step 84, access to the database is provided for a fee to suppliers who desire to use the electronic option information to offer similar or other goods or services to users who have purchased electronic options.

Method 80 allows other suppliers to target purchasers of electronic options with information about similar goods or services or different types of goods and services offered by a supplier. As was discussed above the electronic options may be made available to other suppliers only if the purchaser gives his/her permission. However, the electronic options may also be made available to other suppliers based on the option terms set by a supplier, and agreed to by a purchaser.

The methods and system described herein may be used for to provide options for b2b, b2c, c2b, c2c or other types of transactions over the Internet. However, the present invention is not limited to these transactions and other types of transactions can also be used.

The methods and systems described herein may offer the following advantages for suppliers: (1) a supplier may make additional revenue from electronic option fees even if an electronic option is not exercised by a purchaser; (2) a supplier is in complete control of the electronic option terms; (3) a supplier may be able convert browsers into purchasers by allowing a browser to risk a small amount of money for the ability to reserve a purchase of a desired good or service with an electronic option; and (4) a supplier can use demographic information collected from a user and associated with an electronic option to cross-sell additional goods or services.

The methods and system described herein may offer the following advantages for purchasers: (1) a purchaser can use an option to lock in a lower price for an item that may be in high demand; (2) a purchaser can use the reservation price from a computer network supplier to comparison shop at "brick and mortar" suppliers; (3) a purchaser can reserve a purchase of a good or service for a gift for an occasion that is months into the future and take actual delivery just before the occasion; and (4) a purchaser can risk a small amount of money to reserve the right to purchase a good or service in the future, but not be obligated to actually purchase the good or service.

Prioritized Electronic Option Purchase Rights

FIG. 8 is a flow chart illustrating Method 86 for providing electronic options for goods or services with a priority system. At Step 88, plural electronic options are provided to a plurality of client network devices (12, 14, 16) via a server network device (e.g., 20, etc.) via a computer network 18 for a desired good or service provided by a supplier (e.g., Supplier 1, etc.). The electronic option terms are established by the supplier. The plural electronic options are available for purchase via a plural pre-determined option fees. The plural electronic options are provided based on a priority ordering scheme. At Step 90, a pre-determined option fee is received to purchase an electronic option based on the priority ordering scheme on the server network device via the computer network. At Step 92, the purchase of the electronic option is recorded in a database 20' associated with the server network device 20 in a pre-determined priority order for a prioritized group in the priority ordering scheme. At Step 94, a request is received to exercise the purchased electronic option to purchase the desired good or service based on the priority order established for the prioritized group in the priority ordering scheme.

In one embodiment, the pre-determined priority order includes purchased electronic options from one or more different pre-determined priority time periods for one or more prioritized groups. For example, in one embodiment, the pre-determined priority order includes X-purchased electronic options selected from a first pre-determined time period, Y-purchased electronic options selected from a second pre-determined time period, etc., wherein the value of X can be equal or different from that of the value of Y. In another embodiment, the pre-determined priority order includes all purchased electronic options from a first time period then all purchased electronic options from a second time period, etc.

In another embodiment, a purchaser of an electronic option can also pay a larger pre-determined option fee to obtain a more favorable position in the pre-determined priority order to allow exercise of the electronic option in a different priority order than that initially purchased. Various other combinations can also be used for the pre-determined priority order. However, the present invention is not limited to these embodiments and other embodiments can be used to practice the invention.

In one embodiment, the priority ordering scheme is based on time. In another embodiment, the priority ordering scheme is based on amount of option fees paid. In another embodiment, the priority ordering scheme is based on one or more different priority groups where electronic options are available for purchase at one or more different associated priority times. However, the present invention is not limited to these embodiments and other priority ordering schemes can also be used to practice the invention.

Electronic Options with Additional Components as an Incentive to Purchase

FIG. 9 is flow chart illustrating Method 96 for providing electronic options with plural levels of components for goods or services using a priority ordering. At Step 98, plural of electronic options are provided to plural client network devices (12, 14, 16) via a server network device (e.g., 20, etc.) via the computer network 18 for a desired good or service provided by a desired supplier (e.g., Supplier 1, etc.). The electronic option terms are established by the desired supplier. The electronic options are available for purchase for a pre-determined option fee with plural additional components provided for the goods or services. A number of the additional components provided decreases over a time period the electronic option is available. The additional components are provided to a purchaser of the electronic option at no additional charge as an incentive to purchase the electronic option at an earlier period of time in the priority ordering scheme. At Step 100, a pre-determined option fee is received to purchase an electronic option based on the priority ordering scheme on the server network device 20 via the computer network 18. At Step 102, the purchase of the electronic option is recorded in a database 20' associated with the server network device for the priority ordering scheme including any additional components made available. At Step 104, a request is received to exercise the purchased electronic option to purchase the desired good or service including any additional components made available based on the priority ordering scheme.

In one embodiment, the additional components for goods include additional accessories, extended warranties, additional rebates, extended rebates, extended return polices for goods purchased with the electronic option, etc. The additional components for services include additional service features for services purchased with the electronic option.

In one embodiment, the additional component for the good or service is an extended right of return or refund for the good or service. For example, if the standard return period is three months, an electronic option for extending the return period by an additional X months could be made available as an option for purchase during time period A, for an additional Y months for time period B, and an additional Z months for time period C, etc., where A is first in time, B is later in time than A and C is later in time than B, etc.

In one embodiment, the additional component for the good or service is a right to extend the warranty term on a good or service. For example, if the standard warranty period is one year, an option for extending the warranty period by an additional X years could be made available as an electronic option purchased during time period A, for an additional Y years purchased during time period B, and an additional Z years for purchase during time period C, etc.

In one embodiment, the additional component for the good or service is a right to extend the term of a rebate offer and/or an additional rebate offer. For example, if a given rebate offer expires in September, an electronic option for extending the rebate period by an additional X months could be made available as an option for purchase during time period A, for an additional Y months for purchase during time period B, and an additional Z months for time period C, etc.

In one embodiment, the additional component for the good or service is a right to modify any of the electronic option terms and/or any of the terms of purchasing the actual good or service during a time period after purchasing the electronic option. For example, the purchaser of a good such as a car may purchase an electronic option to purchase a new car, trade the car in for a specific price by a specific date or purchase an electronic option to add a specified upgrade to feature set purchased for the car at a later date.

In all of these embodiments, the additional components provided by the supplier are used as an incentive to get purchasers to purchase an electronic option earlier in a time period the electronic option is provided. This helps the supplier of the good or service better manage its supply and demand of the desired good or service.

In another embodiment, the broker or vendor charges an additional fee option fee for the additional components. In such an embodiment, the additional features that are available are not tied to a time period in which the electronic option is purchased. Instead the additional features are tied to a slightly higher option fee used to purchase the electronic option. For example, for a highest option fee, a good may include three additional components. For a second highest option fee, a good may include two additional components, etc.

In one embodiment, vendors and brokers bundle additional goods or services to the underlying goods or services to create an additional incentive to purchase an electronic option earlier in time. The earlier in time an electronic option was purchased the more additional components that would be available. The later in time an electronic option was purchased the fewer additional components that would be available. As a result, vendors and brokers can bundle additional value in their electronic options at no cost to consumer who purchase their electronic options earlier in time and better manage their own supply and demand.

As an example suppose a new mobile phone is being released in September. The manufacturer offers options that guarantee first-day delivery of the new mobile phone when it is available to the purchaser of the option. Terms for electronic options purchased by June 30 will include a phone case and car charger with the phone and an extended four year warranty; options purchased after June 30 and before August 1, will receive only the car charger. Electronic options purchased after August 1 will receive no additional components.

In another embodiment, Method 96 includes other than a time priority order. In such an embodiment, the priority order includes a price priority order. A larger a price paid for the electronic option fee, the more additional features provided to a purchaser. In such an embodiment, the larger an option fee paid by the purchaser, the more additional components the purchaser receives.

Automatic Execution of Electronic Options During an Electronic Purchase Transaction Automatic exercising of options integrates the use of electronic options purchased with the methods and systems described herein seamlessly into an e-commerce or brick and mortar commerce flow for a user. It allows users to purchase electronic options and "buy it and forget it" as they are automatically processed when a purchase of a desired good or service is made.

Typically with a purchased electronic option described herein, when a purchaser is ready to receive the desired good or server covered by the purchased electronic option, the purchased electronic option is executed to complete a purchase of the good or server under the terms of the electronic option to receive the desired good or service.

There are several problems that can occur with exercising an electronic option. For example, users who have purchase many different electronic options might not always remember all of the goods or services that they hold options on. Or, more than one person might share the use of an account, for example a husband and wife, and one person might not be aware of available purchase electronic options in their account.

In these scenarios, there is a danger that that a purchaser could purchase a good or service at a regular price while their purchase electronic option remains unexercised. In addition, a user might be doing shopping that involves a purchase of both goods or services that they have purchased electronic options on and products that they don't have any purchase electronic options on. It is cumbersome for them to follow separate procedures to exercise purchased options and to separately purchase other goods or services that they don't hold any purchased electronic options on.

Many types of accounts may contain or have access to the purchased electronic options database 20' for accessing during the shopping and checkout process, including but not limited to: an account at an e-commerce site, or a membership or loyalty-type account, or a credit card, debit card or electronic payment account, etc. Any one of those with the ability to access an external option database during the shopping/checkout process.

The process of automatically exercising options is transparent to the user and checks each item as it is placed in an e-tailer electronic shopping cart and/or basket and/or bag (such as AMAZON.com, BUY.com, etc.) or as it is electronically scanned at checkout in a physical store and/or as a user completes a purchase in either place.

If an electronic option has previously been purchased by the purchaser on an item being placed in the cart or being scanned at check out in a store, the methods and system described herein automatically exercises purchased electronic options and automatically in real-time determines a final purchase price for the good or service being purchased.

The final purchase price is determined using plural factors including the purchase price of the electronic option, the final exercise price of the electronic option and/or a price reduction using reward and/or loyalty and/or game points (e.g., from SONY PLAYSTATION, MICROSOFT XBOX, NINTENDO WII, etc.).

If an electronic option has previously been purchased by the purchaser on an item being purchased, the methods and system described herein automatically exercises purchased electronic options and automatically in real-time determines a final price for the good or service being purchased.

In one exemplary scenario, a user using a client network device 12, 14, 16 has provided account identification and access information and is logged in to an e-commerce account via server network device 22, 24, 25. The user "places" all of their items into their shopping cart and/or bag and/or basket. The items in the shopping cart and/or bag and/or basket being purchased are looked up in the electronic options database 20'. The final purchase price for selected items is determined.

For example, if there is an active purchased electronic option with an exercise price lower than the current price, the system 10 automatically updates the current price with a final purchase price including the option exercise price, and the purchased electronic option is marked as "exercise pending." When a purchaser completes the purchase, purchased electronic options marked as "exercised" in the database 20'.

In another exemplary scenario, a user has provided account identification and access information and is logged in to an e-commerce account. While shopping, that user dynamically places and/or removes items in the shopping cart and/or bag and/or basket., etc. As the items are placed in and/or removed from the shopping cart and/or bag and/or basket system 10 is used to check the options database 20' to determine if that user holds an active option (i.e., active meaning eligible to be exercised) on that item.

If there is an active option, the system 10 automatically in real-time updates a final purchase price and the purchased electronic option is marked as "exercise pending" in the database 20'. If items covered by the purchase electronic option are removed from the shopping cart and/or bag and/or basket, the "exercise pending" status is removed. If the shopping cart is abandoned or has expired, the "exercise pending" status of any options covering products in the shopping cart are removed from the database 20'.

FIGS. 10A and 10B are a flow diagram illustrating a Method 106 for providing automatic execution of electronic options during an electronic purchase transaction. In FIG. 10A at Step 108, plural electronic options are provided to plural client network devices each with one or more processors from a first server network device with one or more processors via a computer network for a desired good or service provided by a supplier. The electronic option terms are established by the supplier. The plural electronic options are not supplied or governed via a central government agency and are not supplied or governed via security laws. The plural electronic options are available for purchase via plural pre-determined option fees. At Step 110, the first server network device securely receives a pre-determined option fee from a client network device to purchase an electronic option for a desired good or service via the computer network. At Step 112, the first server network device records the purchase of the electronic option for the desired good or service in a database associated with the first server network device. At Step 114, the first server network device receives a request message via the computer network from a second server network device with one or more processors to exercise the purchased electronic option recorded in the database during a purchase of a good or service associated with the purchased electronic option. In FIG. 10B at Step 116, one or more query messages are sent from first server network device with information from the request message to one or more other servers via the computer network to retrieve additional electronic information associated with the purchased electronic option. At Step 118, one or more query response messages are received on the first server network device from the one or more other server network devices via the computer network including additional electronic information associated with the purchased electronic option. At Step 120, the first server network device automatically determines a final purchase price for the desired good or service based on the electronic option terms for the purchase electronic option, the pre-determined option fee for the purchased electronic option, a final option exercise price determined for the purchased electronic option and the additional electronic information associated with the purchased electronic option obtained from the one or more query response message. At Step 122, a response message is securely sent in real-time from the first server network device to the second server network device via the computer network including a final purchase price for the good or service based on exercising the purchased electronic option.

Method 106 is illustrated with an exemplary embodiment. However, the present invention is not limited to this exemplary embodiment, and other embodiments can also be used to practice the invention.

In such an exemplary embodiment In FIG. 10A at Step 108, plural electronic options are provided to a plural client network devices 12, 14, 16 each with one or more processors from a first server network device 20 with one or more processors via a computer network 18 for a desired good or service provided by a supplier. The electronic option terms are established by the supplier. The plural electronic options are not supplied or governed via a central government agency and are not supplied or governed via security laws. The plural electronic options are available for purchase via a plural pre-determined option fees.

In a specific embodiment, the plural electronic options can be purchased for goods or services that currently exist and/or do not currently exist and/or may never exist. The plural electronic options can be purchased for entertainment events, sporting events, airline flights, etc. that will happen and/or may never happen and/or may never actually be selected and booked. However, the present invention is not limited to this specific embodiment, and other embodiments can also be used to practice the invention.

In one embodiment, the plural electronic options can be purchased, offered for sale and re-sold by a purchaser to other purchasers in secondary and/or third-party option markets via the computer network 18. Such re-sale depends on the option terms for the desired goods or services originally provided by a supplier and/or a vendor.

In the specific embodiment, the plural electronic options are provided and purchased based on the priority ordering scheme described above. However, the present invention is not limited to this specific embodiment, and other embodiments can also be used to practice the invention.

At Step 110, the first server network device 20 receives a pre-determined option fee from a client network device 12, 14, 16 to purchase an electronic option for a desired good or service via the computer network 18.

In the specific embodiment, Step 110, includes securely receiving the pre-determined option fee from a smart application 27 on the client network device 12, 14, 16, wherein the client network device comprises a smart phone 16 or tablet computer 12.

At Step 112, the first server network device 20 records the purchase of the electronic option for the desired good or service in a database 20' associated with the server network device 20.

At Step 114, the first server network device 20 receives a request message via the computer network 18 from a second server network device 22 with one or more processors to exercise the purchased electronic option recorded in the database 20' during a purchase of a good or service associated with the purchased electronic option.

In the specific embodiment, the request message received at Step 114 includes a request message received during an item selection procedure and/or a payment procedure for an electronic commerce (e-commerce) transaction on the second server network device 22. For example, the selection procedure may be an electronic selection procedure as a desired item is placed in an electronic cart and/or bag an/or basket. The payment procedure may be an electronic payment procedure for a check-out from an electronic shopping cart/basket/bag, or from a brick and mortar store, etc. However, the present invention is not limited to this specific embodiment, and other embodiments can also be used to practice the invention.

In FIG. 10B At Step 116, one or more query messages are sent from first server network device 20 with information from the request message to one or more other servers 24, 25 via the computer network 18 to retrieve additional electronic information associated with the purchased electronic option.

In the specific embodiment, the information from the request message includes, but is not limited to, user information for a user of the client network device 12, 14, 16, login information, purchased electronic option identifier and/or other identification information. However, the present invention is not limited to the identification information described and other identification information can also be used to practice the invention.

In the specific embodiment, the one or more query messages are sent to one or more other servers 24, 25 to access an account at an e-commerce site, a membership account, or loyalty account, a credit card account, a debit card account, an electronic payment account (e.g., PAYPAL, etc.), a social networking account (e.g., FACEBOOK, MYSPACE, UTUBE, etc.) or social networking identifier and/or a coupon provider site account (e.g., GROUPON, SOCIAL LIVING, etc.), retailer site, to collect a coupon, etc. However, the present invention is not limited to this specific embodiment, and other embodiments can also be used to practice the invention.

At Step 118, one or more query response messages are received on the first server network device 20 from the one or more other server network devices 24, 25 via the computer network 18 including additional electronic information associated with the purchased electronic option.

In the specific embodiment the additional electronic information may include, but is not limited to, membership account information, or loyalty account information (e.g., gas stations, airlines, retailers, gaming sites, credit card (e.g., AMERICAN EXPRESS points, DISCOVER CARD cash back, debit card, etc.), a credit card authorization, a debit card authorization, an electronic payment account (e.g., PAYPAL, etc.), a social networking account information (e.g., FACEBOOK, MYSPACE, UTUBE, etc.) an electronic coupon code and/or other coupon information from a couponing site (e.g., GROUPON, SOCIAL LIVING, etc.) social networking site (e.g., FACEBOOK, etc.) and/or retailer site, etc. However, the present invention is not limited to this specific embodiment, and other embodiments can also be used to practice the invention.

At Step 120, the first server network device automatically determines a final purchase price for the desired good or service based on the electronic option terms for the purchase electronic option, the pre-determined option fee for the purchased electronic option, a final option exercise price determined for the purchased electronic option and the additional electronic information associated with the purchased electronic option obtained from the one or more query response message.

The final purchase price is automatically determined based on the electronic option terms, the pre-determined option fee for the purchased electronic option including and/or not including the priority ordering scheme, a final option exercise price determined for the purchased electronic option and/or the additional electronic information associated with the purchased electronic option. Any single factor, and combination of factors and/or all listed factors can be used to determined the final purchase price for the desired good or service. The invention is not limited to the factors listed and other factors may also be used to determine the final purchase price of the desired good or service.

In one specific embodiment, the final option exercise price is determined: (1) to be a lowest price for that item during a specified time period (e.g., previous calendar quarter, etc.). This ensures that buyers have locked in a lowest available price, not just a fixed price determined at a time of option purchase; (2) corresponding to a pre-determined external price factor (e.g., such as a level of the Dow Jones, a currency price, an exchange rate, etc.) The exercise price is determined (or modified) by the pre-determined external price factor at the time of purchase, or it could be calculated based on a low, high, or average level during a specified period; (3) based on an occurrence of an external event (e.g., if the Chicago Bulls score 100 points in a game, option holders on any basketball equipment receive 20% off of their option exercise price on the following day). Creating terms such as these help vendors with co-marketing opportunities and help them generate interest and excitement around their options offerings; (4) based on a number of electronic options actually purchase for the desired good or service; or (5) based on actual demand and/or availability for the desired good or service. However, the present invention is not limited determinations of the final option exercise price described, and other embodiments can also be used to practice the invention.

At Step 122, a response message is securely sent in real-time from the first server network device 20 to the second server network device 22 via the computer network 18 including a final purchase price for the good or service based on exercising the purchased electronic option.

A "real-time" response transaction occurs within a one to three seconds after the transaction is requested. However, longer or shorter time periods can also be used for the real-time response.

The response message is sent "securely" using one or more of the security and/or encryption techniques described above. However, the present invention is not limited to this exemplary embodiment, and other embodiments can also be used to practice the invention.

Method 106 is also used to allow purchase of the electronic options described herein for third-party recipients for giving of gifts to others. The electronic option terms provided for the electronic option offered for purchase include additional electronic option terms for third-party recipients. Steps 110 and 112 described above transparently allow an electronic option fee to be received, recorded and exercised for a third-party recipient.

It is normal for people to purchase gifts for others for many reasons, birthdays, holidays, graduations, etc. There are inefficiencies in the current system of purchasing gifts. The purchaser does not always know what the recipient wants, which can result in disappointment and returned gifts. A system that includes the gifting of the electronic options described herein increases the efficiency of the system of gifting. Recipients are likely to only exercise options on gifts they actually want, increasing satisfaction and reducing returns. Additionally, gift givers who are uncertain about choosing the right give can gift options on multiple products, allowing the recipient to select from the desired product(s).

A consumer who is uncertain of what gift to buy a person may purchase an option on a product intended as a gift. The right to exercise the option, and receive the product, is assigned to a third-party, the intended gift recipient. The third-party is subject to the terms of the option, including exercise date and expiration date.

In one scenario, the purchaser simply assigns the right to exercise the option and receive the product to a third-party recipient, with payment responsibility transferring to the recipient with the option.

In another scenario, the purchaser (gift giver) assigns the right to exercise the option and receive the product to a third-party recipient, and also pre-authorizes payment from the purchaser's account. The third-party recipient is able to exercise the option and receive the product as a gift without incurring any costs. The purchaser's loyalty and/or reward and/or game points may also be used to reduce the final cost of the desired good or service.

In another scenario, the purchaser (gift giver) purchases more than one option with or without using the priority ordering scheme described above, assigns the rights to a third-party recipient to exercise one or more of the options, and the rights to receive the product or products, with payment pre-authorized to come from the purchaser's account. This allows the purchaser to gift multiple options, assigning the recipient the right to exercise a subset of the options (e.g.: one of three, or two of five, or three of three, etc.) with a greater chance of satisfaction on the part of the recipient and a successful gift giving experience.

In another scenario, the purchaser assigns the right to pay for the exercising of the options and purchasing the desired good or service to third-party recipient. This allows the third-party recipient to purchase the desired good or service with the electronic option and receive a better final purchase price than could be obtained without a purchase of the electronic option.

Electronic Option for Travel Related Goods and Services

Prices on airlines tickets and other travel-related products can fluctuate and vary greatly over time, depending on many factors. Furthermore, the timelines related to availability and optimal pricing for the different component products of a trip, such as: airline tickets, hotel room, rental car and other products, operate independently. It is possible that the price of one or more of the components of a planned trip may be significantly higher by the time a traveler is ready to purchase, or the item may no longer be available. This makes for a problematic situation for the travel planner, who has sometimes competing goals of getting the best price, ensuring availability, and holding off on the purchase until absolutely certain that the trip will be able to or will need to take the trip.

Purchasing a package or bundle of options for travel related goods and services for an upcoming trip gives the traveler much greater control and certainty regarding pricing and availability of plural travel related goods and services. As an example, a traveler to Las Vegas could not only lock in optimal pricing on airfare, hotel and car rental, but could also purchase options for tickets to multiple shows, guaranteeing their choices will be available, while giving themselves time to decide which show they will attend.

Types of trip/travel related goods and services include, but not limited to: airline tickets, airline ticket upgrades, car rentals, hotel, restaurant/dining options, activities (including, but not limited to amusement park entry, water park entry, ski lift tickets, tours, etc.), amenities (including, but not limited to conference room rental, health club access, etc.), event tickets (including, but not limited to, theater, sports, music, etc.).

The electronic options described herein also include electronic options for bonus amenities for exercising within a certain timeframe or on a certain date. A vendor may act as an aggregator or market maker for electronic options for travel related goods and services from other vendors or suppliers.

A vendor can offer electronic options on travel related goods and services individually, or on travel related goods and services combined into a package (e.g., a ski trip with airline, hotel, transportation and lift tickets included, etc.) with a single option, or on travel-related options selected a la carte, with the traveler able to select options on one or more products associated with a trip as desired. With the a la carte selection, the option exercise dates and expiration dates could be fully aligned (i.e., exercise dates and expiration dates identical for all options in package, etc.), partially aligned (i.e., exercise and expiration dates identical for selected ones of the goods and/or services but not others, etc.), or unaligned (i.e., exercise and expiration dates are different for each electronic option, etc.).

A final option exercise price may be fixed at the time of purchase or may be fixed at a future date, depending on factors determined by the vendor. In one embodiment, a final option exercise price is calculated to be a lowest price during a defined period, such as from the option purchase date to the option exercise date, or from the option purchase date to the date that the trip is initiated. This ensures that travelers have locked in the lowest price in a time range, not just a fixed price determined at the time or option purchase. Option holders are also allowed to resell their options in an options market by setting a fixed price or by negotiating with a another buyer.

One type of plural electronic options provided herein at Steps 28, 88, 98 and 108, include electronic options for airline tickets. The electronic options for airline tickets include in their electronic option terms, specialized option terms that allow the reservation of plural airline fares on plural routes, plural destinations and plural fare classes at the same time for a pre-determined period (e.g., ten days, etc.). Such an electronic option for airline tickets allows plural different airline seats to be temporality reserved without paying the full fare for the actual airline ticket.

The pre-determined period of time will vary depending on a desired reservation date, destination and class of fare. For example, the pre-determined time period may be smaller (e.g., five days, etc.) during holiday seasons or destinations with a popular event happening (e.g., the Olympics or other sporting or entertainment event, etc.) and longer for other seasons and/or destinations.

For, example, a purchaser of such an electronic option may select a first destination on a first route with a first fare class, the same destination on a second route with a second fare class, etc. and reserve ten different seats on ten different flights.

Such electronic options for airline tickets allow a group of family and friends to coordinate a trip easier. The purchasers use the electronic option to reserve plural airline seats to one or more desired destinations during desired dates on desired routes and desired fare classes and confirm the itineraries with friend and families before paying full fare for the airline ticket. A purchaser is able to use the electronic option to reserve plural flights and yet only exercise the electronic option on one (or more) final desired flights. When the electronic option is exercised all other temporary reservations are canceled and the airline tickets for seats on for the final flight(s) are issued. If the electronic option is not exercised, the airline keeps the option fee and all the temporary reservations are automatically canceled.

Figure 11B:
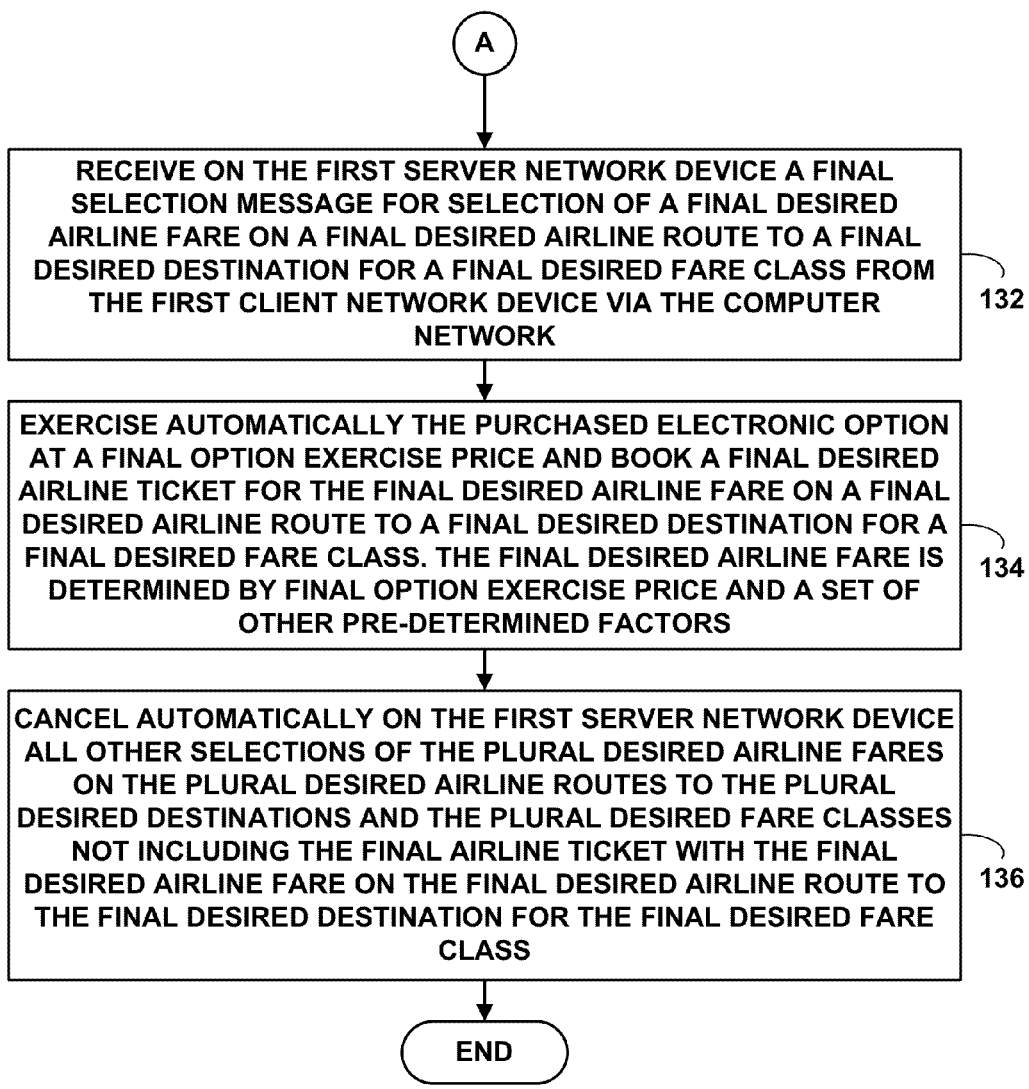

FIGS. 11A and 11B are flow diagram illustrating a Method 124 for providing automatic execution of electronic options. In FIG. 11A at Step 126, plural electronic options for airline tickets are provided from the first server network device. The plural electronic options include specialized airline option terms that allow the reservation of a plural airline fares on plural airline routes to plural destinations and plural fare classes for a pre-determined period. At Step 128, the first server network device securely receives a pre-determined option fee from a first client network device to purchase an electronic option with the specialized airline option terms for airline tickets via the computer network. At Step 130, the first server network device receives one or more selection messages for selection of plural desired airline fares on a plural desired airline routes to plural desired destinations and plural desired fare classes from the first client network device via the computer network. The selection message includes a list of other client network devices to which the selection information is to be sent. In FIG. 11B at Step 132, the first server network device receives a final selection message to exercise the purchased electronic option including selection of a final desired airline fare on a final desired airline route to a final desired destination for a final desired fare class from the first client network device via the computer network. At Step 134, the purchased electronic option is automatically exercised at a final option exercise price and booking an airline ticket for the final desired airline fare on a final desired airline route to a final desired destination for a final desired fare class, wherein the final desired airline fare is determined by final option exercise price and a set of other pre-determined factors. At Step 136, the first server network device automatically cancels all other selections of the plural desired airline fares on the plural desired airline routes to the plural desired destinations and the plural desired fare classes not including the final desired airline fare on the final desired airline route to the final desired destination for the final desired fare class.

Method 124 is illustrated with an exemplary embodiment. However, the present invention is not limited to this exemplary embodiment, and other embodiments can also be used to practice the invention.

In such an exemplary embodiment in FIG. 11A at Step 126 plural electronic options for airline tickets are provided from the first server network device 20. The plural electronic options include specialized airline option terms that allow the reservation of plural airline fares on plural airline routes to plural destinations and plural fare classes for a pre-determined period.

In one embodiment, a set of the plural electronic options for the airline tickets is provided by a server network device associated with a social networking site (FACEBOOK, TWITTER, MYSPACE, UTUBE, etc.), a couponing site (e.g., GROUP ON, SOCIAL LIVING, etc.) or an e-commerce site (e.g., AMAZON.com, BUY.com, EXPEDIA.com, UNITED.com, DELTA.com, SOUTHWEST.com, etc.) However, the present invention is not limited to such and embodiment and other embodiments can also be used to practice the invention.

At Step 128, the first server network device 20 securely receives a pre-determined option fee from a first client network device (e.g., 12, etc.) to purchase an electronic option with the specialized airline option terms for airline tickets via the computer network 18.

At Step 130, the first server network device 20 receives one or more selection messages for selection of plural desired airline fares on plural desired airline routes to plural desired destinations and plural desired fare classes from the first client network device 12 via the computer network 18. The selection message includes a list of other client network devices 14, 16 to which selection information is to be sent.

In one embodiment, the first server network device 20 sends the received selection information to the other client network devices 14, 16 included in the received list via the computer network 18 to allow a trip to be coordinated among selected client network devices 12, 14, 16. The received one or more selection messages include a list of the other client network devices 12, 14 to send the one or more selection messages to. However, the present invention is not limited to this embodiment and other embodiments can also be used to practice the invention with and without sending messages to coordinated among the selected client network devices.

In FIG. 11B at Step 132, the first server network device 20 receives a final selection message to exercise the purchased electronic option including selection of a final desired airline fare on a final desired airline route to a final desired destination for a final desired fare class from the first client network device 12 via the computer network 18.

At Step 134, the purchased electronic option is exercised automatically at a final option exercise price and a final airline ticket is booked for the final desired airline fare on a final desired airline route to a final desired destination for a final desired fare class. The final desired airline fare is determined by final option exercise price and a set of other pre-determined factors.

In one specific embodiment, the final option exercise price is determined: (1) to be a lowest price for that good and/or service during a specified time period (e.g., previous calendar quarter, etc.). This ensures that buyers have locked in a lowest available price, not just a fixed price determined at a time of option purchase; (2) corresponding to a pre-determined external price factor (e.g., such as a fuel price, a level of the Dow Jones, a currency price, an exchange rate, etc.) The exercise price is determined (or modified) by the pre-determined external price factor at the time of purchase, or it could be calculated based on a low, high, or average level during a specified period; (3) based on an occurrence of an external event; (e.g., a number of people use a coupon for a targeted good or service, etc.) (4) based on a number of electronic options actually purchased for the desired good or service; or (5) based on actual demand and/or availability for the desired good or service. However, the present invention is not limited to the determinations of the final option exercise price described, and other embodiments can also be used to practice the invention.

The set of other pre-determined factors include a number of accumulated game, reward or loyalty points, a number of accumulated miles, electronic coupon information from a couponing site, or electronic information from a social networking site. However, the present invention is not limited to the pre-determined factors described and more, fewer or other pre-determined factors can be used to practice the invention.

At Step 136, the first server network device 20 automatically cancels all other selections of the plural desired airline fares on the plural desired airline routes to the plural desired destinations and the plural desired fare classes not including the final airline ticket with final desired airline fare on the final desired airline route to the final desired destination for the final desired fare class.

If the purchased electronic option for the airline ticket is not executed before the expiration of the pre-determined option time period, the first server network device 20 cancels all selections of the plural desired airline fares on the plural desired airline routes to the plural desired destinations and the plural desired fare classes.

Figure 12:
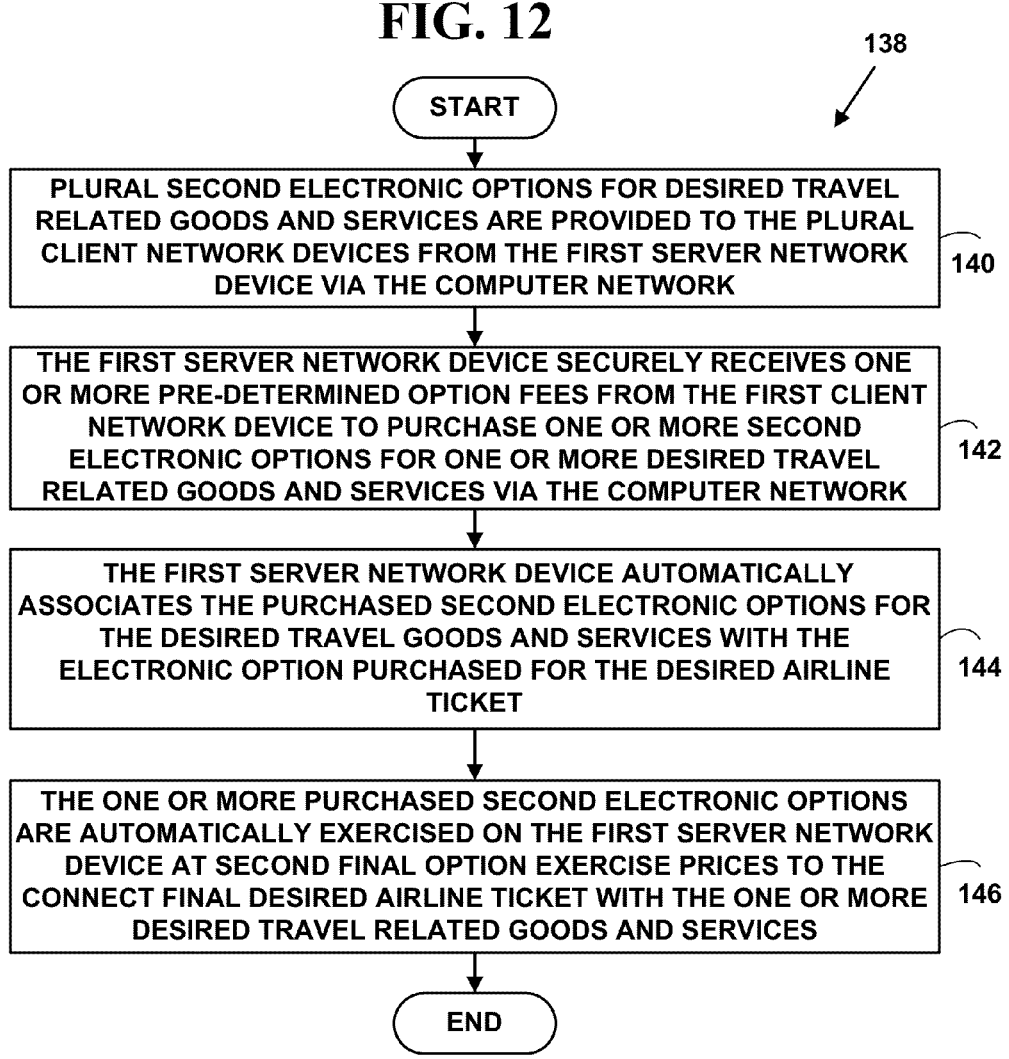
FIG. 12 is a flow diagram illustrating a method for providing automatic execution of electronic options.

FIG. 12 is a flow diagram illustrating a Method 138 for providing automatic execution of electronic options. At Step 140, plural second electronic options for desired travel related goods and services are provided to the plural client network devices from the first server network device via the computer network. At Step 142, the first server network device securely receives one or more pre-determined option fees from the first client network device to purchase one or more second electronic options for one or more desired travel related goods and services via the computer network. At Step 144, the first server network device automatically associates the purchased second electronic options for the desired travel goods and services with the electronic option purchased for the desired airline ticket. At Step 146, the one or more purchased second electronic options are automatically exercised on the first server network device at second final option exercise prices to the connect final desired airline ticket with the one or more desired travel related goods and services.

Method 138 is illustrated with an exemplary embodiment. However, the present invention is not limited to this exemplary embodiment, and other embodiments can also be used to practice the invention.

In such an exemplary embodiment, at Step 140, plural second electronic options for desired travel related goods and services are provided to the plural client network devices 12, 14, 16 from the first server network device 20 via the computer network 18.

At Step 142, the first server network device 20 securely receives one or more pre-determined option fees from the first client network device 12 to purchase one or more second electronic options for one or more desired travel related goods and services via the computer network 18.

At Step 144, the first server network device 20 automatically associates the purchased second electronic options for the desired travel goods and services with the electronic option purchased for the desired airline ticket.

In one embodiment, Step 144 includes combining all purchased electronic options and all purchased second electronic options into one single electronic option that is exercised automatically on the first server network device 20.

At Step 146, the one or more purchased second electronic options are automatically exercised on the first server network device 20 at second final option exercise prices to the connect final desired airline ticket with the one or more desired travel related goods and services.

In one embodiment, Step 146, includes exercising automatically the one or more purchased second electronic options as fully aligned electronic options wherein exercise dates and expiration dates identical for the purchased second electronic options, exercising automatically the two or more purchased second electronic options as partially aligned electronic wherein expiration dates for selected ones of the two or more purchased second electronic options are identical and other selected ones of the two or more purchase second electronic options are not identical or exercising the two or more purchased second electronic options as unaligned electronic options wherein exercise and expiration dates are all different for all of the two or more purchased second electronic options. However, the present invention is not limited to this embodiment and other embodiments can be used to practice the invention.

The desired travel related goods and services include, for example, rental car reservations, hotel room reservations, hotel amenities, local attraction tickets, event tickets, and/or theme park tickets. However, the present invention is not limited to the desired travel related goods and services described and more, fewer or other desired travel related goods and services can be used to practice the invention.

In one embodiment, Step 134 of FIG. 11 and Step 146 of FIG. 12 are executed simultaneously. However, the present invention is not limited to a simultaneous execution of these steps and non-simultaneous execution can also be used to practice the invention.

The electronic options are used to reserve plural airline fares on a plural airline routes to plural destinations and a plural of fare classes for a pre-determined period. A final airline fare, route, destination and fare class is determined when the electronic option is actually exercised. The method and system allows the electronic options to be purchased to book now and pay later for airline tickets and other travel goods and services such rental cars, hotel rooms, event tickets, local attraction tickets, theme park tickets, etc. The method and system also allow electronic options purchased for airline tickets to be automatically associated with other types of electronic options purchased for other travel related goods and services.

Electronic Options for Airline Services

Airlines are offering wider variety of services to make additional revenues. The services include charging passengers for checking bags, for reserving specific seats, for priority boarding, etc. However, not all passenger requests can be accommodated because most of the resources on an airplane and a selected airplane flight are limited. The electronic options described herein (e.g., FIGS. 1-5 and related text, etc.) are used for providing plural different opportunities for passengers to attempt to reserve one or more additional airline goods and/or services. The one or more additional airline services may or may not be associated with an actual airline good, such as an airline seat, etc. The additional airline services may include both airlines goods and/or airlines and various combinations thereof.

Figure 13B:
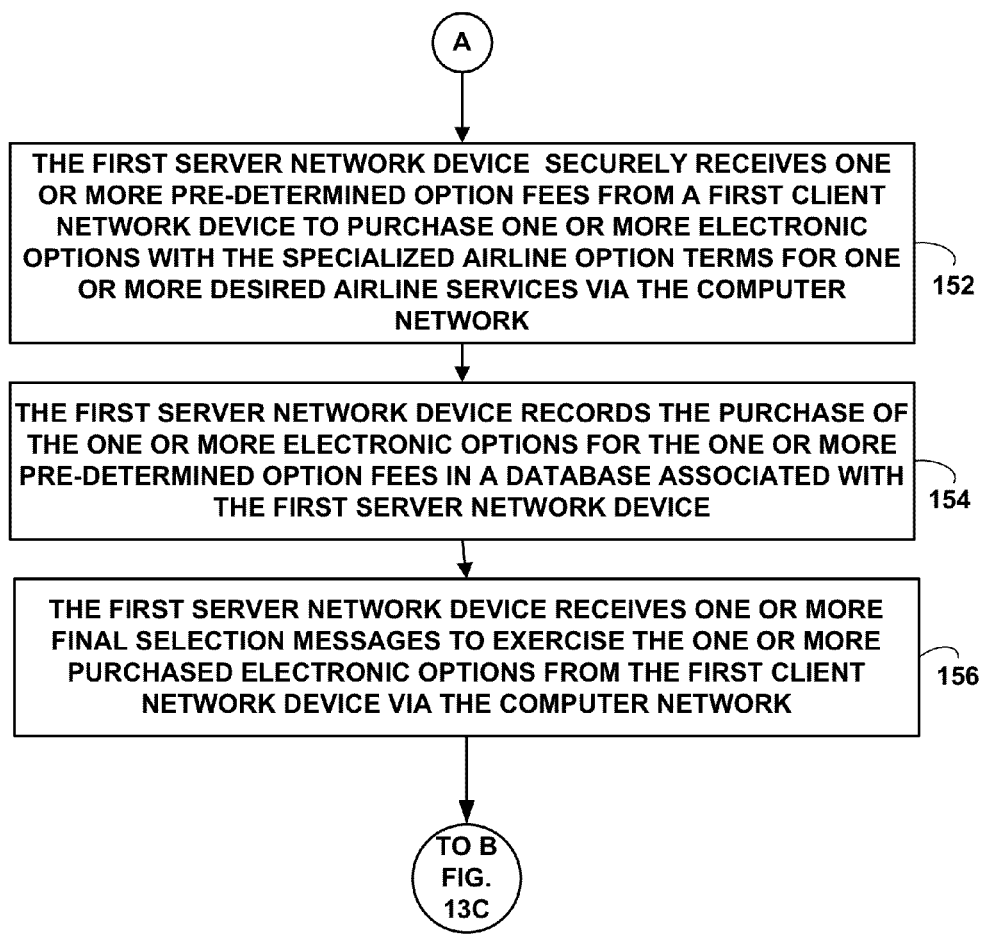

FIGS. 13A, 13B and 13C are a flow diagram illustrating a Method 148 for providing automatic execution of electronic options for airline services.

In FIG. 13A at Step 150, plural electronic options for plural different airline services are sent to plural client network devices each with one or more processors from a first server network device with one or more processors via a computer network. The plural airline services include services for a selection of: a desired seat row location, a desired seat location in a desired row location, a plural adjacent seats in a desired row, a plural adjacent seats in plural desired rows, a desired location in an overhead bin to store carry-on luggage, a priority boarding sequence, a priority exiting sequence, priority pre-flight baggage handling, priority post-flight baggage handling, cancellation and change privileges for a purchased airline ticket, a priority list position in a stand-by list and/or a priority list position in an up-grade list for an automatic upgrade to a first class seat, business class seat or other non-economy seat and/or other types of airline services. The plural options include specialized airline option terms that allow reservation of the plural airline services for a pre-determined period. The plural electronic options are not supplied or governed via a central government agency and are not supplied or governed via security laws and the plural electronic options are available for purchase via a plural different pre-determined option fees.

In FIG. 13B, at Step 152, the first server network device securely receives one or more pre-determined option fees from a first client network device to purchase one or more electronic options with the specialized airline option terms for one or more desired airline services via the computer network. At Step 154, the first server network device records the purchase of the one or more electronic options for the one or more pre-determined option fees in a database associated with the first server network device. At Step 156, the first server network device receives one or more final selection messages to exercise the one or more purchased electronic options from the first client network device via the computer network.

In FIG. 13C, at Step 158, at test is conducted to determine whether the one or more desired airline services are actually available for purchase with the one or more purchased electronic options at the desired airline, from the first service network device via the computer network. If so, at Step 160, the one or more purchased electronic options are exercised automatically, each at a final option exercise price and reserving the one or more desired airline services at the desired airline from the first client network device via the computer network. At Step 162, a confirmation is sent from the first server network device to the first client network device via the computer network indicating the one or more desired airline services have been purchased with the one or more purchased electronic options at the desired airline.

Method 148 is illustrated with an exemplary embodiment. However, the present invention is not limited to this exemplary embodiment, and other embodiments can also be used to practice the invention.

In FIG. 13A at Step 150, plural electronic options (i.e., described in FIGS. 2 and 3 and related text, etc.) for plural different airline services are sent to plural client network devices 12, 14, 16 each with one or more processors from a first server network device (e.g., 20, etc.) with one or more processors via a computer network 18.

In a specific embodiment at Step 150, the electronic options are sent via the computer network 18 to one or more other server network devices 22, 24, 25, etc. associated with social networking site (e.g., FACEBOOK, MYSPACE, UTUBE, etc.), electronic couponing sites (e.g., GROUPON, SOCIAL LIVING, etc.), e-travel sites (e.g., EXPEDIA. COM, ORBITZ.COM, KAYAK.COM, etc.), airline sites (e.g., AMERICAN, UNITED, SOUTHWEST, DELTA, etc.) e-retailer sites (e.g., BEST BUY, TARGET, etc.) and/or an e-commerce site (e.g., AMAZON.COM, BUY.COM, etc.) etc. This allow other family, friends and/or acquaintances of the purchaser to coordinate travel plans and purchase the desired airline services with the purchased electronic options.

This also allows a purchaser to re-sell and/or offer for sale and/or offer for re-sale, the purchased electronic option to other purchaser who original purchaser does not know. For example, a purchaser's favorite sports team may win a game that makes the team eligible for a playoff game in a far away city. The purchaser may immediately purchase plural electronic options for airline services to the far away city anticipating demand will be high. This allow the purchaser to make money from his/her purchased option in a secondary and/or third party option market. However, the present invention is not limited to this specific embodiment, and other embodiments can also be used to practice the invention.

In one embodiment, the plural airline services include, but are not limited to, services for a selection of: a desired seat row location, a desired seat location in a desired row location, a plural adjacent seats in a desired row, a plural adjacent seats in plural desired rows, a desired location in an overhead bin to store carry-on luggage, a priority boarding sequence, a priority exiting sequence, priority pre-flight baggage handling, priority post-flight baggage handling, cancellation and change privileges for a purchased airline ticket, a priority list position in a stand-by list and/or a priority list position in an up-grade list for an automatic upgrade to a first class seat, business class seat or other non-economy seat. However, the present invention is not limited to such an embodiment and more, fewer, different and other types of airline services can also be used to practice the invention with the electronic options described herein.

The plural options include specialized airline option terms that allow reservation of the plural airline services for a pre-determined period. The plural electronic options are not supplied or governed via a central government agency and are not supplied or governed via security laws and the plural electronic options are available for purchase via a plural different pre-determined option fees.

In one embodiment, Method 148 further includes Step 151, determining a loyalty factor for each of the plural client network devices, automatically adjusting the plural different pre-determined option fees for the plural airline services based on the determined loyalty factor to create a unique set of pre-determined option fees for each of the plural client network devices and providing the created unique set of pre-determined option fees to each of the plural client network devices based on the determined loyalty fact at Step 150 and the invention can be practiced without these additional Step 151.

In FIG. 13B at Step 152, the first server network device 20 securely receives one or more pre-determined option fees from a first client network device (e.g., 12, etc.) to purchase one or more electronic options with the specialized airline option terms for one or more desired airline services via the computer network 18.

In one embodiment, Method 148 further includes Step 153, sending from the first client network device 20 to one or more other client network devices 14, 16 via the computer network 18 a message (e.g., a electronic mail, text, social networking post, tweet, etc.) including one or more electronic links (e.g., HyperText Markup Language, (HTML), etc.) to the one or more purchased electronic options for one or more desired airline services, thereby allowing any of the one or more other client network devices 14, 16 to exercise any of the one or more purchased electronic options for the one or more desired airlines services and be coordinated with the first client network device 12 for dates and times of the one or more of the desired airline services. However, the present invention is not limited to executing these steps and the invention can be practiced without these additional Step 153.

In another embodiment, Method further includes Step 153', posting from the first client network device 12 via the computer network 18 a message on a social networking site (e.g., FACEBOOK, etc.) or a couponing site (GROUPON, etc.) including one or more electronic links to the one or more purchased electronic options for one or more desired airline services, thereby allowing any of the one or more other client network devices 14, 16 to exercise any of the one or more purchased electronic options for the one or more desired airlines services and be coordinated with the first client network device 12 for dates and times of the one or more of the desired airline services.

Such an embodiment, allows a first purchaser to invite and/or entice one or more other friends to join him/her on a trip by pre-purchasing one or more electronic options and reserving a desired set of airlines services for the first purchaser's friends and allows the one or more other friends to then exercise the purchased electronic options to join the first purchaser. However, the present invention is not limited to executing these steps and the invention can be practiced without these additional Step 153'.

At Step 154, the first server network device 20 records the purchase of the one or more electronic options for the one or more pre-determined option fees in a database 20' associated with the first server network device 20.

At Step 156, the first server network device 20 receives one or more final selection messages to exercise the one or more purchased electronic options from the first client network device 12 via the computer network 18.

In a specific embodiment, at Step 156, the first server network device 20 receives one or more pre-determined option fees from a smart application 27 on the first client network device 12, 16. The first client network device comprises a smart phone 16 and/or tablet computer 12 with the smart application 27. However, the present invention is not limited to such an embodiment and more, fewer and other types of client network devices (e.g. computer 14, etc.) can also be used to practice the invention with the electronic options described herein.

In FIG. 13C, at Step 158, at test is conducted to determine whether the one or more desired airline services are actually available for purchase with the one or more purchased electronic options at the desired airline from the first service network device 20 via the computer network 18.

In another embodiment, an expiration time and date for each of the one or more purchased electronic options are determined. The purchased electronic options are exercised automatically at the determined expiration time and date, each at a final option exercise price. The one or more desired airline services are automatically reserved at the desired airline from the first client network device via the computer network.

For example, a purchaser may be required to "opt-in" (e.g., with smart application 27, etc.) to the automatic exercise of any purchased electronic options automatically. This allows a purchaser to purchase and electronic option for a desired airline service and not be required to take any further action to have the purchased electronic option automatically exercised.

In such an embodiment the application 27 also provides a manual override, to not exercise the purchased electronic option earlier or to exercise the purchased electronic option at any time before the expiration time and date for the purchased electronic option.

If the test at Step 158 determines the one or more desired airlines services are available for purchase, at Step 160, the one or more purchased electronic options are exercised automatically, each at a final option exercise price and reserving the one or more desired airline services at the desired airline (e.g., 24, etc.) from the first client network device 20 via the computer network 18.

In one embodiment, the test at 158 is not necessary as all of the one or more desired airlines services reserved by an electronic option will always be available for purchase. However, the present invention is not limited to such an embodiment and other embodiments can be used to practice the invention.

In another embodiment, the one or more desired airline services may not be available for purchase via the purchased electronic option. In such an embodiment, one or the electronic option terms for the desired services indicated that the desired airline services may be sold directly to purchasers and may be sold out at a time and date a purchased electronic option must be exercised. In such an embodiment, the desired airline services would be available only if no other purchasers had directly purchased the desired airline services, leaving them available for the purchasers of purchased electronic options. However, the present invention is not limited to such an embodiment and other embodiments can be used to practice the invention.

In another embodiment, any purchased electronic option will include as part of its electronic option terms a priority purchase term. In such an embodiment, the desired airline services will always be available to a purchaser of an electronic option. In such an embodiment, direct purchasers of airline services my be wait listed to changed to an overbooked status to keep desired airline services always available to purchasers of electronic options. However, the present invention is not limited to such an embodiment and other embodiments can be used to practice the invention.

At Step 162, a confirmation is sent from the first server network device 20 to the first client network device 12 via the computer network 18 indicating the one or more desired airline services have been purchased with the one or more purchased electronic options at the desired airline 24.

In a specific embodiment, selected ones of the electronic options for the plural airline services can be purchased and exercised only before a selected airline flight departs.

For example, pre-flight airline services, include, but are not limited to, selection of a desired seat row location (e.g., row 14, exit row, bulkhead row, etc.), selection of a desired seat location (e.g., seat 14A, window, isle, middle, etc.) in a desired row location, selection of a plural adjacent seats in a desired row (e.g., seats 14A, 14B, 14C, etc.), selection of a plural adjacent seats in a plural desired rows (e.g., seats, 14A, 14B, 14C in row 14 and seats 15A, 15B, 15C, in row 15, etc.), selection of a desired location in an overhead bin to store carry-on luggage (e.g., directly above seat 14A, etc.), selection of a priority boarding sequence (e.g., first wave, second wave, etc.), selection of priority pre-flight baggage handling (e.g., curbside, valet, gate check, etc.) cancellation and change privileges for a purchased airline ticket (e.g., pay a $10 electronic option fee to change and/or cancel a purchased ticket if necessary for only $20 when the electronic option is exercised instead of a normal $150 change/cancellation fee, etc.), selection of a priority position in a stand-by list, and/or selection of a priority list position (e.g., position number 1 for all passengers even those with more miles, loyalty status, loyalty points, etc.) for an automatic upgrade to a first class seat, business class seat or other non-economy seat, etc. However, the present invention is not limited to such an embodiment and more, fewer and other types of pre-flight and post-flight airline services can also be used to practice the invention with the electronic options described herein.

In one specific embodiment, other selected ones of the electronic options for the plural airline services can be purchased and exercised before the selected airline departs as was just described and also after the selected airline flight arrives.

For example, post-flight airline services, include, but are not limited to, selection of a priority exiting sequence (e.g., first wave to leave the plane, second wave, etc.), selection of priority post-flight baggage handling (e.g., first luggage on the carousel, etc.), purchase and selection of electronic options for a next leg of a multi-leg flight, a return flight, etc. However, the present invention is not limited to such an embodiment and more, fewer and other types of pre-flight and post-flight airline services can also be used to practice the invention with the electronic options described herein.

For example, to use electronic options for post-flight airline services, a passenger may land at an airport and turn on his/her smart phone 16 or table computer 12 and receive a message that they must attend a meeting that starts an hour from now at a location remote from the airport. The passenger may use the present invention from an application 27 on his/her smart phone 16 to purchase and exercise an option for selecting of priority exiting from the plane for selection of priority post-flight baggage handling so the passenger can be one of the first to exit the airplane and also be one of the first passengers to have their check luggage be placed on a the luggage carousel. However, the present invention is not limited to such an embodiment and more, fewer and other types of pre-flight and post-flight airline services can also be used to practice the invention with the electronic options described herein.

In a specific embodiment, if the airplane includes the ability for passengers to connect to a wireless connection such as WiFi, WiMAX, etc. during the flight, other selected ones of the airline services can be can be purchased and exercised in-flight. Such in-flight electronic options can be used to purchases and exercise electronic options for post-flight activities (e.g., priority exiting, priority baggage handling, etc.) and pre-flight electronic options for another flight (e.g., a second leg of a multi-leg flight, a return flight, a future flight, etc.).

The present invention can be practiced with various combinations of electronic options that are purchased and exercised, pre-flight, in-flight and/or post-flight.

In a specific embodiment, the one or more pre-determined option fees include a purchase price, a number of game, reward or loyalty points, a number of miles, an electronic coupon from a social networking site, an electronic coupon from a couponing site or electronic advertising information from a social networking site. However, the present invention is not limited to such an embodiment and more, fewer and other types of pre-determined option fees can be used to practice the invention.

In a specific embodiment, selected ones of the one or more pre-determined option fees include a pre-determined option fee of zero. In such an embodiment, the purchaser providers the vendor with other types of consideration for the value received in turn for purchasing the electronic option with a purchase fee of zero.

For example, the purchaser may provide an e-mail address, phone, number, social networking identifier, etc. in exchange for a pre-determined option fee of zero. Such identifiers are valuable to option providers and vendors to establish a customer database 20', 22', 24', 25' and to send future new and additional offers (e.g., FIG. 6, etc.) to directly interested purchasers. However, the present invention is not limited to such an embodiment and more, fewer and other types of pre-determined option fees can be used to practice the invention.

In another specific embodiment, other selected ones of the one or more pre-determined option fees include a pre-determined option fee of zero. In such an embodiment, the vendor providers the purchaser with consideration for the value received in turn for purchasing the electronic option with a purchase fee of zero in exchange for direct participation in marketing and promotional activities. For example, a vendor such as a airline may provide a passenger an electronic option with a purchase fee of zero to try out a new airline service (e.g., priority exiting, etc.) in exchange for providing a mandatory testimonial or completing a mandatory survey, etc.

In a specific embodiment, selected ones of the one or more electronic options include a final option exercise price that fluctuates prior to exercise. The final option exercise price may fluctuate prior to exercise, or it may go up, down or stay same or become zero. In such an embodiment, the electronic option only guarantees availability of a desired airline service but not the final option exercise price. The final option exercise price may also fluctuate and then the electronic option guarantees to lock in the lowest price during a defined period.

In another embodiment, the electronic option purchase price is divided into plural payments paid for at plural different times by a purchaser. When the electronic option price is divided into plural payments, the final option exercise price may remain fixed, it may adjust at each partial payment point, it may fluctuate freely, it may increase or decrease progressively in sync with, or independently of each payment, or it may be zero.

The present invention includes a method and system for reserving future purchases of airline services using electronic options. The electronic options are used to reserve plural different types of airline services as described herein and/or other types of airline services.

It should be understood that the programs, processes, methods and system described herein are not related or limited to any particular type of computer or network system (hardware or software), unless indicated otherwise. Various types of general purpose or specialized computer systems may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams.

While various elements of the preferred embodiments have been described as being implemented in software, in other embodiments hardware or firmware implementations may alternatively be used, and vice-versa.

The claims should not be read as limited to the described order or elements unless stated to that effect. In addition, use of the term "means" in any claim is intended to invoke 35 U.S.C. §112, paragraph 6, and any claim without the word "means" is not so intended.

Therefore, all embodiments that come within the scope and spirit of the following claims and equivalents thereto are claimed as the invention.

We claim:

1. A method for providing automatic execution of electronic options, comprising:

providing a plurality of electronic options for a plurality of different airline services to a plurality of client network devices each with one or more processors from a first server network device with one or more processors via a computer network, wherein the plurality of airline services include services for a selection of: a desired seat row location, a desired seat location in a desired row location, a plurality of adjacent seats in a desired row, a plurality of adjacent seats in a plurality of desired rows, a desired location in an overhead bin to store carry-on luggage, a priority boarding sequence, a priority exiting sequence, priority pre-flight baggage handling, priority post-flight baggage handling, cancellation and change privileges for a purchased airline ticket, a priority list position in a stand-by list and a priority list position in an up-grade list for an automatic upgrade to a first class seat, business class seat or other non-economy seat, wherein the plurality of electronic options include specialized airline option terms that allow reservation of the plurality of airline services for a pre-determined period, wherein the plurality of electronic options are not supplied or governed via a central government agency and are not supplied or governed via security laws and wherein the plurality of electronic options are available for purchase via a plurality of different pre-determined option fees;

receiving securely on the first server network device one or more pre-determined option fees from a first client network device to purchase one or more electronic options with the specialized airline option terms for one or more desired airline services via the computer network;

recording on the first server network device the purchase of the one or more electronic options for the one or more pre-determined option fees in a database associated with the first server network device;

receiving on the first server network device one or more final selection messages to exercise the one or more purchased electronic options from the first client network device via the computer network;

determining whether the one or more desired airline services are actually available for purchase with the one or more purchased electronic options at the desired airline, from the first service network device via the computer network, and if so, exercising automatically the one or more purchased electronic options, each at a final option exercise price and reserving the one or more desired airline services at the desired airline from the first client network device via the computer network; and sending a confirmation from the first server network device to the first client network device via the computer network indicating the one or more desired airline services have been purchased with the one or more purchased electronic options at the desired airline.

2. A non-transitory computer readable medium having stored therein a plurality of instructions for causing one or more processors on a network device to execute the steps of:

providing a plurality of electronic options for a plurality of different airline services to a plurality of client network devices each with one or more processors from a first server network device with one or more processors via a computer network, wherein the plurality of airline services include services for a selection of: a desired seat row location, a desired seat location in a desired row location, a plurality of adjacent seats in a desired row, a plurality of adjacent seats in a plurality of desired rows, a desired location in an overhead bin to store carry-on luggage, a priority boarding sequence, a priority exiting sequence, priority pre-flight baggage handling, priority post-flight baggage handling, cancellation and change privileges for a purchased airline ticket, a priority list position in a stand-by list and a priority list position in an up-grade list for an automatic upgrade to a first class seat, business class seat or other non-economy seat, wherein the plurality of electronic options include specialized airline option terms that allow reservation of the plurality of airline services for a pre-determined period, wherein the plurality of electronic options are not supplied or governed via a central government agency and are not supplied or governed via security laws and wherein the plurality of electronic options are available for purchase via a plurality of different pre-determined option fees;

receiving securely on the first server network device one or more pre-determined option fees from a first client network device to purchase one or more electronic options with the specialized airline option terms for one or more desired airline services via the computer network;

recording on the first server network device the purchase of the one or more electronic options for the one or more pre-determined option fees in a database associated with the first server network device;

receiving on the first server network device one or more final selection messages to exercise the one or more purchased electronic options from the first client network device via the computer network;

determining whether the one or more desired airline services are actually available for purchase with the one or more purchased electronic options at the desired airline, from the first service network device via the computer network, and if so, exercising automatically the one or more purchased electronic options, each at a final option exercise price and reserving the one or more desired airline services at the desired airline from the first client network device via the computer network; and sending a confirmation from the first server network device to the first client network device via the computer network indicating the one or more desired airline services have been purchased with the one or more purchased electronic options at the desired airline.

3. The method of claim 1 wherein the one or more pre-determined option fees include a purchase price, a number of game, reward or loyalty points, a number of miles, an electronic coupon from a couponing site or electronic advertising information from a social networking site.

4. The method of claim 1 wherein selected ones of the one or more pre-determined option fees are zero.

5. The method of claim 4 wherein the selected ones of the zero pre-determined option fees are provided by a vendor in exchange for an electronic mail address, a telephone number or a social networking identifier of a purchaser.

6. The method of claim 4 wherein other selected ones of the zero pre-determined option fees are provided by a vendor in exchange for a purchaser participating in an advertising or promotional activity determined by a vendor.

7. The method of claim 1 wherein the step of providing a plurality of electronic options further includes:
determining a loyalty factor for each of the plurality of client network devices;
automatically adjusting the plurality of different pre-determined option fees for the plurality of airline services based on the determined loyalty factor to create a unique set of pre-determined option fees for each of the plurality client network devices; and
providing the created unique set of pre-determined option fees to each of the plurality of client network devices based on the determined loyalty factors.

8. The method of claim 1 wherein selected ones of the electronic options for the plurality of airline services can be purchased and exercised only before a selected airline flight departs and other selected ones of the electronic options for the plurality of airline services can be purchased and exercised in-flight and yet other selected ones of the electronic options can be purchased and exercised only after the selected airline flight arrives.

9. The method of claim 1 wherein the first server network device is an interactive electronic kiosk with an graphical user interface.

10. The method of claim 9 wherein a plurality of the interactive electronic kiosks are included in an airport.

11. The method of claim 1 wherein the step of receiving on the first server network device one or more pre-determined option fees includes receiving the one or more pre-determined option fees from a smart application on the first client network device, wherein the first client network device comprises a smart phone or tablet computer.

12. The method of claim 1 wherein a set of the plurality of electronic options for one or more desired airline services is provided by a server network device with one or more processors associated with a social networking site, a couponing site, an airline site, an e-retailer site or an e-commerce site.

13. The method of claim 1 wherein selected ones of the one or more pre-determined option fees are divided into a plurality of payments and paid for by a purchaser with a plurality of payments.

14. The method of claim 1 wherein the final option exercise price remains fixed, fluctuates freely, increases or decreases progressively, or becomes zero.

15. The method of claim 1 further comprising:
determining automatically an expiration time and date for each of the one or more purchased electronic options; and
exercising automatically at the determined expiration time and date the one or more purchased electronic options, each at a final option exercise price and reserving the one or more desired airline services at the desired airline from the first client network device via the computer network.

16. The method of claim 1 further comprising:
sending from the first client network device to one or more other client network devices via the computer network a message including one or more electronic links to the one or more purchased electronic options for one or more desired airline services,
thereby allowing any of the one or more other client network devices to exercise any of the one or more purchased electronic options for the one or more desired airlines services and be coordinated with the first client network device for dates and times of the one or more of the desired airline services.

17. The method of claim 1 further comprising:

posting from the first client network device via the computer network a message on a social networking site or a couponing site including one or more electronic links to the one or more purchased electronic options for one or more desired airline services, thereby allowing any of the one or more other client network devices to exercise any of the one or more purchased electronic options for the one or more desired airlines services and be coordinated with the first client network device for dates and times of the one or more of the desired airline services.

18. The method of claim 1 further comprising:

providing the plurality of electronic options for the plurality of different airline services to a plurality of other server network devices each with one or more processors from the first server network device via the computer network, wherein the plurality of other server network devices are associated with social networking sites, electronic couponing sites, airline sites, e-commerce sites and e-retailer sites.

19. The method of claim 1 wherein the first server network device includes a wireless networking interface comprising a Worldwide Interoperability for Microwave Access (WiMax) wireless networking interface with $4^{th}$ generation (4G) wireless speeds for communicating with the computer network and the plurality of client network devices.

20. A system for providing automatic execution of electronic options for airline services, comprising in combination:

means for providing a plurality of electronic options for a plurality of different airline services to a plurality of client network devices each with one or more processors from a first server network device with one or more processors via a computer network, means for providing the plurality of electronic options for the plurality of different airline services from an electronic kiosk server network device with one or more processors via a computer network located in an airport, wherein the plurality of airline services include services for a selection of: a desired seat row location, a desired seat location in a desired row location, a plurality of adjacent seats in a desired row, a plurality of adjacent seats in a plurality of desired rows, a desired location in an overhead bin to store carry-on luggage, a priority boarding sequence, a priority exiting sequence, priority pre-flight baggage handling, priority post-flight baggage handling, cancellation and change privileges for a purchased airline ticket, a priority list position in a stand-by list and a priority list position in an up-grade list for an automatic upgrade to a first class seat, business class seat or other non-economy seat, wherein the plurality of electronic options include specialized airline option terms that allow reservation of the plurality of airline services for a pre-determined period, wherein the plurality of electronic options are not supplied or governed via a central government agency and are not supplied or governed via security laws and wherein the plurality of electronic options are available for purchase via a plurality of different pre-determined option fees;

means for receiving securely on the first server network device one or more pre-determined option fees from a first client network device to purchase one or more electronic options with the specialized airline option terms for one or more desired airline services via the computer network;

means for recording on the first server network device the purchase of the one or more electronic options for the one or more pre-determined option fees in a database associated with the first server network device;

means for receiving on the first server network device one or more final selection messages to exercise the one or more purchased electronic options from the first client network device via the computer network;

means for determining whether the one or more desired airline services are actually available for purchase with the one or more purchased electronic options at the desired airline, from the first service network device via the computer network, and if so, means for exercising automatically the one or more purchased electronic options, each at a final option exercise price and reserving the one or more desired airline services at the desired airline from the first client network device via the computer network;

means for sending a confirmation from the first server network device to the first client network device via the computer network indicating the one or more desired airline services have been purchased with the one or more purchased electronic options at the desired airline; and means for posting from the first client network device via the computer network a message on a social networking site, an electronic couponing site or an e-commerce site including one or more electronic links to the one or more purchased electronic options for one or more desired airline services, thereby allowing any of the one or more other client network devices to exercise any of the one or more purchased electronic options for the one or more desired airlines services and be coordinated with the first client network device for dates and times of the one or more of the desired airline services.

* * * * *